(12) United States Patent
Forni

(10) Patent No.: US 8,701,865 B2
(45) Date of Patent: Apr. 22, 2014

(54) UNSCRAMBLING MACHINE FOR CONTAINERS AND RELATIVE PROCESS

(75) Inventor: Lorenzo Forni, Sala Baganza (IT)

(73) Assignee: Lorenzo Forni, Sala Baganza (PR) (IT)

(*) Notice: Subject to any disclaimer, the term of this patent is extended or adjusted under 35 U.S.C. 154(b) by 134 days.

(21) Appl. No.: 13/509,352

(22) PCT Filed: May 14, 2010

(86) PCT No.: PCT/IB2010/001152
§ 371 (c)(1),
(2), (4) Date: May 11, 2012

(87) PCT Pub. No.: WO2011/058399
PCT Pub. Date: May 19, 2011

(65) Prior Publication Data
US 2012/0217131 A1 Aug. 30, 2012

(30) Foreign Application Priority Data

Nov. 12, 2009 (IT) ................................ FI2009A0235

(51) Int. Cl.
*B65G 11/20* (2006.01)
*B65G 29/00* (2006.01)
*B65G 47/24* (2006.01)
*B65G 47/248* (2006.01)

(52) U.S. Cl.
USPC ........... 198/395; 198/384; 198/392; 198/393; 198/394; 198/397.05

(58) Field of Classification Search
USPC ......... 198/382, 383, 384, 392, 393, 394, 395, 198/396, 397.01, 397.02, 397.04, 397.05, 198/399
See application file for complete search history.

(56) References Cited

U.S. PATENT DOCUMENTS

| | | | | |
|---|---|---|---|---|
| 3,791,553 A | * | 2/1974 | Aidlin et al. | 221/156 |
| 4,979,607 A | * | 12/1990 | Fogg | 198/392 |
| 5,058,724 A | * | 10/1991 | Hinton | 198/376 |
| 5,415,322 A | * | 5/1995 | Sala | 221/169 |
| 5,499,708 A | * | 3/1996 | Gorecki et al. | 198/400 |
| 5,549,189 A | * | 8/1996 | Martisala | 198/380 |
| 6,065,587 A | * | 5/2000 | Schindel | 198/465.1 |
| 6,098,781 A | * | 8/2000 | Lanfranchi | 198/400 |
| 6,116,406 A | * | 9/2000 | Marti Sala | 198/395 |
| 6,435,333 B1 | * | 8/2002 | Sala | 198/384 |
| 6,651,802 B2 | * | 11/2003 | Hurst | 198/443 |
| 7,134,540 B1 | * | 11/2006 | Marti Sala | 198/392 |
| 7,258,222 B2 | * | 8/2007 | Marti Sala et al. | 198/393 |
| 7,270,229 B2 | * | 9/2007 | Perazzo et al. | 198/550.4 |
| 7,374,032 B2 | * | 5/2008 | Marti Mercade et al. | 198/400 |
| 7,591,367 B2 | * | 9/2009 | Perazzo et al. | 198/550.2 |
| 8,096,403 B2 | * | 1/2012 | Marti Sala et al. | 198/384 |

FOREIGN PATENT DOCUMENTS

EP 0 856 482 A1 8/1998

\* cited by examiner

*Primary Examiner* — Douglas Hess
(74) *Attorney, Agent, or Firm* — McGlew and Tuttle, P.C.

(57) ABSTRACT

The invention includes a machine for handling and unscrambling empty containers provided with a bottom and with an opening. The machine comprises a carousel rotating about an axis of rotation and is provided with a plurality of pockets. Each of the pockets is provided with a respective channel for descent of the containers through gravity towards a handling area below. The machine further comprises a carousel feeding device equipped with a detecting system which detects the orientation of the containers before the containers are unscrambled. A respective unscrambling station of the containers is provided for each pocket which is controlled on the basis of information supplied by the detecting system and designed to arrange said containers correctly unscrambled with said opening facing upwards.

36 Claims, 10 Drawing Sheets

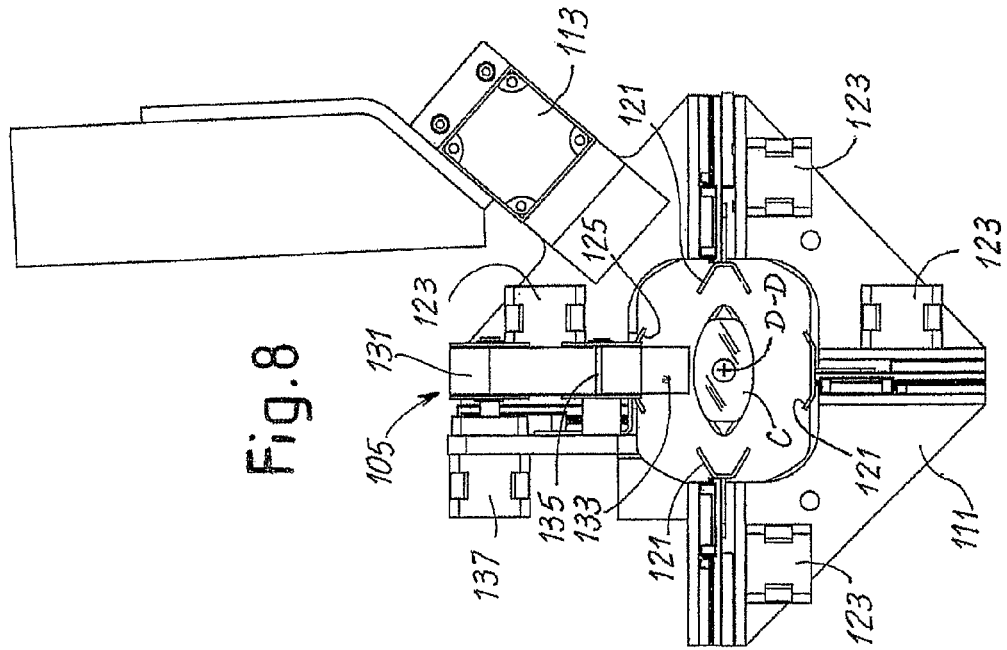
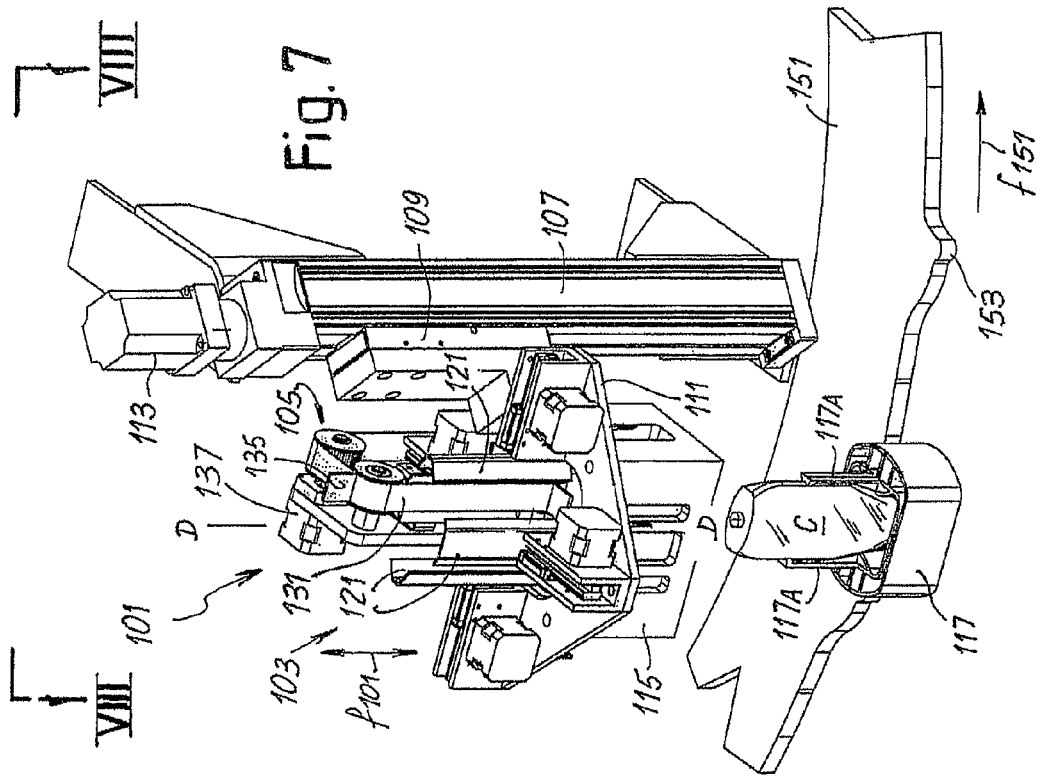

UNSCRAMBLING MACHINE FOR CONTAINERS AND RELATIVE PROCESS

TECHNICAL FIELD

The present invention relates to the field of systems and machines for handling empty containers such as bottles, jars and the like, in order to arrange these containers for subsequent steps, such as filling, labeling, packaging, etc. The handling steps typically concern the operations of unscrambling, orientation and insertion into moving bowls, also known as pucks.

In particular, the present invention relates to a machine for handling empty containers such as bottles and the like of the type comprising an unscrambling station provided on a carousel with peripheral pockets defining channels for conveying the containers through gravity towards a subsequent handling or pick-up area.

The present invention also relates to a process for unscrambling, orienting and/or inserting empty containers such as bottles and the like into pucks.

STATE OF THE ART

As it is known, at industrial level it is often necessary to handle containers such as bottles and the like, to be able to perform thereon a series of operations such as labeling, filling, packaging, sterilization, etc.

To perform these operations, the container must reach the processing area in a predetermined condition, for example, it must arrive in the correct vertical position, with the opening oriented upwards to be filled. In some cases, for example if the container must be labeled and does not have an axially symmetric shape, it must also be fed to the labeling machine with a given angular orientation with respect to its axis.

In some cases the containers are moved along the stations subsequent to those for unscrambling and, if necessary, orientation, inserted into respective bowls (commonly called pucks or "godet") which allow a certain degree of stability during movements. The use of pucks is required when movement of the containers of the processing line is difficult owing to the unstable nature of the containers (for example due to their particularly light weight and to the high movement speed and/or to the shape of the bottom).

The operation that allows correct positioning of the axis of the container (for example preferably vertical with neck/cap facing upwards), that is, the axis identifying the direction from the bottom towards the opening of the container (that is, the upper part of the container in which the opening is generally positioned) or vice versa, is called unscrambling or opening-bottom orientation and the machines that perform this operation are called unscramblers.

The operation that allows correct positioning of a part of the container with respect to its axis of extension, i.e. correct angular orientation of the container with respect to its axis (that is, the axis identifying the direction from the bottom towards the upper part of the container, in which the opening is positioned, or vice versa), is simply called orientation and the machines that perform this operation are called orientators or angular orientators.

There are different kinds of the aforesaid machines. An unscrambler of known type is, for example, provided with a rotating carousel at the center of which is a compartment to receive containers arranged randomly. During rotation, the containers from the center are carried to the periphery of the carousel with their axis substantially tangent to the direction of rotation of the carousel but with random orientation. Using mechanical "trap" systems present on the periphery of the carousel, the containers are made to descend with the correct orientation (that is, the correct opening-bottom orientation), into pockets that convey them downwards defined on the periphery of this carousel. Operation of these "traps" is substantially passive. The trap is configured in such a manner as to form a fulcrum for the downward oscillation movement of the containers that are housed in the pockets of the machine. The shape of the trap is such that the fulcrum is positioned aligned with the neck of the container, so that the center of gravity of this container, released to descend downward from a horizontal position, causes descent with rotation contained by the lateral walls of the descent channel. These passive trap systems have numerous drawbacks. The descent channel is very high with respect to the dimension of the container. Moreover, the transverse dimension is also considerable and it cannot guide the container during descent, as it must allow rotation in one direction or in the opposite direction of the container descending freely along the channel. Any positioning error causes a blockage of the machine.

In an orientator of known type, containers enter already unscrambled in a line formed by bodies rotating according to vertical axes and which pick up the containers, rotate them axially by the desired angle (detected on the basis of orientation detecting systems, for example of the type with viewing systems, radar systems, infrared systems, etc.). Once oriented, the containers are sent using gripping units that move these containers along a movement line to take them to a subsequent processing area, for example filling or insertion into pucks.

Some known machines provide for insertion of the containers which descend along the descent or falling channels directly into a puck or godet below. However, in these machines containers can only be inserted into some puck formats, which allow insertion through uncontrolled descent, so that the container is not inserted precisely, but loosely: these pucks are unable to hold the container in a clamped position with direct access to the labeling area of the package, for example.

To perform insertion into all types of puck, a known system for example provides for the use of gripper units designed to pick up the containers from a waiting area and move them over the pucks to allow insertion therein.

Although a handling system formed by machines such as those described has been known for many years, it has at least two significant mutually correlated drawbacks.

These drawbacks are linked to the fact that during movement of the containers they are subjected to a large number of knocks, which can damage or ruin the containers with scratches, dents, etc.

Knocks to containers start during the unscrambling step. In fact, here the containers are thrown randomly into the center of the carousel and are moved through a combination of centrifugal force and of the shape of the inner walls of the carousel, towards the periphery. Here they are arranged randomly at the entrances of the pockets where, as a result of mechanical traps, that is, systems with metal dividers against which the containers knock (on the basis of orientation these metal dividers allow the containers to descend into the pockets or fall back into the center of the carousel). Moreover, during descent into the pockets, the containers knock against the walls of these pockets.

Other knocks and handling operations that can damage the container take place during the line change steps between unscrambler, orientator and insertion into pucks and during movement of the containers along these lines.

The unscrambling machines or unscramblers and the orientation machines or orientators, and the devices for inserting the containers into pucks also have the drawback of requiring to be adapted to the format of the containers to be handled. These can change substantially both in shape and dimension. Each time a machine must be adapted to handle a container of a different format it is necessary to prepare the machine by making adjustments and/or replacing parts. This requires lengthy operating times and consequent machine downtime with loss of production. Moreover, it is necessary to provide sets of components variable on the basis of the type of container to be handled, which requires storage space with consequent financial costs.

Moreover, machines with several functions (unscrambling, orientation, insertion into pucks) of known type require accurate conveyor systems, optionally designed with the need to maintain a step between the machines, suitable for managing unstable products (in the case in which containers require be inserted into pucks downstream of the unscrambler) or not yet oriented (in the case that they require to be oriented after the unscrambling step).

SUMMARY OF THE INVENTION

The object of the invention is to overcome, completely or in part, one or more of the drawbacks mentioned above.

The principal object of an embodiment of the present invention is to reduce costs deriving from format change of the containers to be handled.

The object of some embodiments of the invention is to reduce the number of knocks, rubbing and other stresses that can damage the outer surface of containers during their handling.

According to an embodiment, a machine is provided for handling of empty containers such as bottles and the like, which comprises an unscrambling station provided on a carousel with peripheral pockets and channels for descent of the containers through gravity towards a subsequent handling or pick-up area below, a device for feeding the containers towards the carousel and an exit conveyor. The machine is characterized in that it comprises means to detect the opening-bottom orientation of the containers before the unscrambling step and, for each pocket, an unscrambling station of the containers, controlled on the basis of information supplied by the means to detect the opening-bottom orientation of the containers to arrange the containers correctly oriented with the opening facing upwards.

In substance, the unscrambling station can comprise, for each pocket, means for rotation of the containers, controlled by an actuator (for example an electronically controlled electric motor) designed to arrange the containers with the correct orientation (i.e. opening-bottom orientation) on the basis of information supplied by said detecting means or detecting system. These means control orientation of the container, intended as arrangement of the bottom and of the opening with respect to a detecting direction. In some embodiments the detecting means can be arranged along a feed path of the containers towards the carousel. In this case, it is detected whether the opening (or the bottom) of each container is oriented facing forwards or backwards with respect to the direction of advance. By arranging the detecting means upstream of the pockets of the carousel, it is possible to use the information detected also to insert the single containers in a controlled manner into single pockets, if necessary excluding some pockets, or excluding some containers, or performing a process to reject defective containers consisting in omitting the handling operations of defective containers, whose position in the carousel is known, and activating a rejecting member, for example a jet of air, to eliminate defective containers from the respective pocket in a position for unloading rejects.

It would also be possible to arrange the detection means in a fixed position along the trajectory of rotation of the pockets. In this case the orientation detected is that of the opening or of the bottom of each bottle with respect to the direction of rotation of the carousel. In other cases, less advantageous, detecting means can be provided for each pocket. In this case, each detecting means determines the opening-bottom orientation of the bottle with respect to the tangential direction of the pocket. In general, what is important is that the detecting system, i.e. the detecting means, allow the orientation of the opening and of the bottom of the container to be determined, so as to be able to control the rotation means in order to make each container always descend with the bottom oriented downwards with respect to the opening and the opening oriented upwards with respect to the bottom, i.e. correctly oriented (that is, oriented with correct opening-bottom orientation).

It is noted that the rotation means are designed to act in the area of the descent duct of the containers from the pocket towards the height at which the exit conveyor of the machine is located, in a position between the area for receiving the containers in the pocket and the subsequent handling or pick-up area of the containers provided under the exit of the descent channel.

With this configuration, information regarding unscrambling or opening-bottom orientation is associated with the containers located at the entrance of the respective pockets and, without knocks by "mechanical traps", they are rotated in a space between the entrance of these pockets and the area downstream of the same pocket in such as manner as to be correctly unscrambled.

This configuration allows a significant reduction in knocks, as will be particularly evident from the description of preferred embodiments. The idea of performing unscrambling of a container through rotation means in practice downstream of the entrance (or at this entrance) makes it possible to reduce knocks upstream of the entrance and at this entrance, in practice producing a descent channel through which the container slides without previously having been knocked in a particularly damaging manner. In this manner the advantage is also achieved of not leaving the container to drop freely for the entire height from the pocket onto the surface below which then releases it onto the exit conveyor.

With the use of systems for detecting single containers that are fed to the single pockets it is also possible to achieve the further advantage of identifying defective containers, preventing these from continuing to advance along the production line, simply by preventing rotation or oscillation of the aforesaid rotation means. A suitable ejector can be provided along the circular trajectory of the pockets, to eject the defective container identified by the detecting system when the pocket in which it is located travels through the area in which the ejector is located.

Unlike the "mechanical traps" provided on conventional machines, the rotation means are "active" means, preferably operated by electronically controlled electric actuators, which allow greater control by the machine during entry into the pocket and/or unscrambling (opening-bottom orientation) of the container, decreasing the total number of knocks and making the machine flexible, i.e. designed to handle bottles or other containers of variable formats, without the need to provide the machine each time with a series of mechanical traps specifically designed for a given container format.

Advantageously, in a preferred embodiment, the machines comprises, below the pockets and arranged in series from top downwards, respective handling areas to orient the containers and/or respective handling areas for inserting these containers into pucks. In practice, the pockets with these handling areas define a virtual channel inside which a container travels through gravity and in which this container is subjected to the steps of unscrambling, rotation and/or insertion into pucks (or godet), all significantly reducing the knocks that containers can sustain during the line change steps between unscrambler, orientator and insertion into pucks and during movement of the containers along these lines.

Therefore, the machine can comprise, for each pocket:
an unscrambling station; or
an unscrambling station and an orientation station arranged below the unscrambling station; or
an unscrambling station and a station for insertion into pucks arranged below the unscrambling station, or
an unscrambling station, an orientation station arranged below the unscrambling station and a station for insertion into pucks arranged below the orientation station.

It is noted that, besides decreasing knocks and rubbing, with a configuration of handling machine such as the one indicated, an extremely compact layout is obtained (as operations take place from the top downwards and not moving the containers horizontally), thereby reducing the overall dimensions of a system that uses unscramblers, orientators and puck inserters.

According to a particularly advantageous embodiment, the means for detecting opening-bottom orientation of the containers for subsequent control of the rotation means are arranged upstream of the pockets, i.e. they are not arranged at the entrance of the pockets. These means can be of different types, preferably of the type without contact, such as (and preferably) viewing systems with a video camera, or infrared systems, radar systems, etc., although systems of the type with contact could also be used. Added to this characteristic is the fact that the machine comprises an electronic control designed to produce an association between unscrambling of a container detected by the detecting means and the relative pocket into which this container is fed. In this way the container fed to a given pocket does not require trap systems to define its orientation at the entrance of the pocket considerably simplifying the structure of the machine in relation to the carousel and to the entrance of the pockets.

Advantageously, the device for feeding containers towards the carousel is designed to feed the containers directly into respective pockets. Preferably, this device feeds the containers according to a direction substantially tangential to rotation of the carousel. In this manner, the containers do not sustain knocks inside the carousel but are fed directly into the pockets.

With a system for feeding individual containers into the single pockets it is possible to obtain a further important advantage consisting in the fact of excluding any defective positions from processing. For example, if one of the rotation means of a pocket is broken, the relative pocket can be excluded simply by avoiding insertion of containers therein, retaining the container until the subsequent pocket is in front of the feed system.

It is noted how the concept according to which the device for feeding containers towards the pockets of the carousel is designed to feed the containers directly into respective pockets is particularly suitable to prevent knocks and rubbing of the containers traveling from the center of the carousel towards the peripheral pockets, as occurs in conventional machines, and therefore is included within the overall scope of the present invention. In this regard, it is noted that the same system can also be used in the case in which the containers are not unscrambled (or oriented according to a desired opening-bottom orientation) by "active" rotation means as described above, but are fed to mechanical traps of conventional type associated with the pockets of the carousel, in any case obtaining the result of reducing mechanical stresses on the containers.

Therefore, the present invention also relates to an unscrambler or machine for handling and unscrambling empty containers provided with a bottom and an opening, comprising:
a carousel rotating about an axis of rotation, provided with a plurality of peripheral pockets each provided with a respective channel for descent of the containers through gravity towards a handling or pick-up area below,
a device for feeding containers, randomly opening-bottom oriented, towards said carousel,
an exit conveyor arranged at a lower height with respect to said pockets and onto which the containers, unscrambled in an unscrambling step so as to be arranged with the respective openings oriented upwards, are unloaded;
a device for feeding containers towards the carousel arranged to feed the containers in sequence directly into respective pockets of the carousel, preferably according to a direction substantially tangential to rotation of the carousel.

If a viewing system or a detecting system is associated with this feeding device, it is possible to equip a conventional machine with mechanical traps with a system for eliminating rejects. This can be achieved by associating a rejecting member with the viewing system or other detecting means, for example based on the use of a compressed air nozzle, a mechanical diverter or the like located along the path of the pockets, before the point in which the containers are unloaded into the descent channel below. In this manner the defective containers identified by the detecting system are rejected before dropping into the descent channel and therefore excluded from subsequent handling in the line.

In some embodiments, the rotation means are provided, for each pocket, with a plate or support with controlled oscillation, defining the area for receiving the containers, or the bottom of the respective pocket. The oscillating support receives the container resting against it and performs controlled oscillation or rotation, between a position to receive the containers and a downward inclined position to unload the container into the descent channel below.

In this manner, each container is not left to drop freely directly into the pocket in the descent channel below, as occurs in conventional machines, but is made to slide downwards on a guide surface defined by the oscillating support. Moreover, the end of the oscillating support defines with the wall of the channel a mouth of predetermined width so that when the container detaches from the oscillating support, it is obliged to remain against the wall of the channel, that is, it drops through gravity controlled in such a manner that it sustains less stress through knocks. Moreover, this configuration allows containers of variable shapes and dimensions to be handled without requiring to provide a pocket shaped to correspond exactly with the container being processed each time in the machine.

In principle, it would also be possible to unscramble, in the same machine, containers of different shapes and/or dimensions, within acceptable limits, by providing a system for detecting the opening-bottom orientation of the containers also capable of determining the orientation of different containers. This is possible for example using a viewing system with suitable image recognition software.

Advantageously, according to some embodiments, the oscillating support is capable of rotating (controlled by an actuator controlled by the system for detecting opening-bottom orientation of the containers) according to two opposite directions with respect to the position that this oscillating support occupies when it is in the step to receive the container. The direction of rotation of the oscillating support is set on the basis of information regarding unscrambling, or opening-bottom orientation of the container entering the pocket acquired by the means for detecting unscrambling of the container. With this configuration, to a detection of a first opening-bottom orientation of the container follows a rotation of the support in a first direction of rotation, which obliges the container to travel through the descent channel through gravity with the desired unscrambling (that is, opening-bottom orientation), i.e. with the opening oriented upwards. Alternatively, to a detection of a second and opposite opening-bottom orientation of the container instead follows a rotation in the opposite direction to said first direction of rotation, and the container is in any case obliged to travel through the descent channel through gravity with the desired vertical orientation, i.e. correctly unscrambled.

In some embodiments, each descent channel is formed at least in part by two opposite walls, extending radially from an inner wall towards an outer wall defining an interspace in which the pockets of the carousel are arranged, and having two portions converging downwards and towards the center of this pocket. Preferably, these walls start with respective rectilinear portions, mutually parallel, which extend downwards and terminate with the same number of rectilinear portions, mutually parallel. The oscillating support is advantageously arranged between said two walls, and can have an axis of oscillation parallel to the radial extension of said walls.

According to other embodiments, the oscillating support unloads the containers rotating or oscillating always in a single direction with respect to the position taken by the oscillating support when it is in the step to receive the container. Moreover, the rotation means for unscrambling the containers with the correct vertical opening-bottom orientation, comprise a handling device to grip the container, arranged downstream and below the exit of the pocket for conveying the container. This handling device is advantageously overturnable on the basis of information regarding the opening-bottom orientation of the container entering said pocket acquired by the means or system for detecting orientation. With this configuration, detection of a first orientation of the container does not cause overturning of the handling device, as the container is already correctly oriented in vertical direction due to rotation of the oscillating support. Alternatively, detection of a second and opposite opening-bottom orientation of the container causes overturning of the handling device so as to unscramble the container in the predetermined manner.

With reference preferably to this latter embodiment indicated, revolution means can be associated with said handling device, designed to allow both overturning thereof about a direction orthogonal to the axis of the container that can be housed therein to allow unscrambling of this container, and an axial rotation to orient the container angularly with respect to its axis, i.e. to the direction of longitudinal extension between the bottom and the opening of the container. Preferably, this handling device is arranged substantially aligned with the exit of the pocket above in such a manner that the container drops from this pocket through gravity, if necessary sliding on the oscillating support and/or on the wall of the descent channel, into the handling device below.

To allow the pockets to be adapted for containers of different sizes, in some embodiments the carousel comprises on the periphery thereof an annular interspace coaxial with the axis of rotation of this carousel, the pockets being defined inside the interspace. In this configuration, each pocket can be delimited at least in part a) by the inner annular wall of the interspace, b) by an outer annular part and c) by at least one lateral wall facing downwards that extends from the inner annular wall towards the outer annular wall. Means are also present to vary the radial distance between the inner annular part and the outer annular part, designed to allow variation of the radial depth of the pockets.

It is noted how these means to vary the radial distance allow adjustment of a transverse dimension of the container, while the other dimension does not require to be adjusted, due to the fact that unscrambling of the containers is achieved through controlling oscillation of the oscillating support or of the handling device below. Therefore, the pocket can also be substantially longer (in the tangential direction of the carousel) with respect to the longitudinal dimension of the container. It is no longer necessary, as instead occurs in unscramblers based on mechanical systems for vertical opening-bottom orientation (called mechanical traps), to arrange a pocket having a dimension corresponding exactly to that of the container handled each time by the unscrambler.

In some embodiments, the device for feeding containers towards the pockets of the carousel can comprise an input unit of the containers into said carousel according to a direction substantially tangent to this carousel so that the containers are arranged directly at the entrance of the pockets that face, during rotation of the carousel, the exit of the input unit. Movement of said containers by the input unit takes place according to a direction substantially parallel to the axis of these containers.

In some advantageous embodiments, the input unit is associated with electronic synchronization means designed to verify the position of the container, to verify the angular position of the pocket of said carousel into which the container must be inserted and to modify the speed of the container in said input unit in such a manner as to allow the container to be inserted into the relative pocket, i.e. synchronization with said carousel.

More in particular, in some embodiments the input unit, hereinafter also indicated as feeding device, can comprise a feeding channel in which the containers are designed to be translated; the sides of this channel are delimited by a synchronization assembly comprising opposite rotating elements with direction of rotation concordant with the feeding direction of the containers, designed to push/drive the containers by tangential friction. It is noted that the rotation speed of the rotating elements of said assembly is managed by said electronic synchronization means. It would also be possible to insert the containers with other devices, for example using belt, chain or band conveyors, arranged at the sides, or below or above the path of advance of the containers.

According to some advantageous embodiments, a second assembly of opposite rotating elements with direction of rotation concordant with the feeding direction of the containers, is present downstream of the synchronization assembly. These opposite rotating elements are also arranged at the sides of said channel and are designed to further vary the speed of said containers to allow release of the containers into the respective pockets with speeds similar to those of this pocket.

The input unit defined above and better described below with reference to a non-limiting example of embodiment, can also be applied to conventional machines, to synchronize entry of the containers with the movement of the perimeter pockets carried by the rotating carousel of the unscrambling machine.

In some embodiments, the machine comprises, below the pockets and arranged in series from the top downwards, respective handling areas to orient the containers and/or respective handling areas for insertion of the containers into pucks to facilitate subsequent operations, such as labeling or other handling operations to be performed on the containers, such as filling and capping. In practice, the pockets with these handling areas define a virtual channel inside which a container travels through gravity and in which this container is subjected to the steps of unscrambling, rotation (angular orientation), and/or insertion into a puck, all significantly reducing the knocks that containers can sustain during the line change steps between unscrambler, orientator and insertion into pucks and during movement of the containers along these lines.

It appears clear that production of this virtual channel can also be applied to a machine in which the containers are inserted conventionally into the pockets of the carousel, for example with centrifugal feeding systems. This channel can also be produced separate from the system for detecting opening-bottom orientation of the containers and from the system for rotation (orientation) of the containers. For example, the aforesaid channel can also be produced in combination with a conventional bottle unscrambling system of mechanical type, in which descent of the containers into the descent channels is controlled by the shape of the pockets and of the support below, which obliges each bottle to descend always with the opening facing upwards. A configuration of this type in any case makes is possible to achieve a more compact layout and to reduce knocks on the unscrambled, i.e. vertically oriented, bottle.

According to the logic of the virtual channel, the machine according to the invention preferably comprises, for each pocket of the carousel, an orientation (or angular orientation) station of the container, into which the container can be inserted by descent along the descent channel, after having been unscrambled, i.e. vertically oriented with the opening facing upwards. In some embodiments, each orientation station comprises a handling area of the container arranged below the respective pocket of the carousel in such as manner as to receive the containers through gravity directly from the exits of the unscrambling station. Second rotation elements for a relative container are present in each handling area, designed to rotate this container about its axis, or an axis parallel thereto, by a suitable angle to orient the container correctly on the basis of subsequent processes, such as labeling.

In particular, in some embodiments the rotation means of the orientation station comprise a motor designed to rotate opposite lateral abutments, for example formed by sheets or profiles, shaped to define a seat into which the container is inserted and is prevented from rotating with respect to this seat. In this manner, the container is not blocked in the seat (although it can be temporarily by means of a blocking device defined by said opposite lateral abutments) but is obliged to rotate due to the appropriate shape of the abutments defining the seat.

More in particular, the handling area of the orientation station can be provided with a lower support for the container when arranged between said opposite lateral abutments defining the seat of the container. The lower support can, for example, be composed of an annularly extending plane fixed to the machine structure and extending for less than 360°, so as to define an area without support, where the containers descend through gravity.

According to advantageous embodiments, the orientation station of the container can comprise means to adjust the distance between said opposite lateral abutments defining the seat to receive and rotate the container, so as to adapt it to containers of different shapes. If necessary, the abutments or other members defining said seat can also be interchangeable, so as to further increase the flexibility of the machine. For example, it would be possible to adapt the machine to the format of the containers by moving the abutments defining the seat for travel of the containers towards or away from each other, until the variation of format is within certain limits. Beyond these limits, a series of abutments could be replaced with a different series of abutments, also suitable to receive containers of variable format within a different range of formats.

According to the logic of the virtual channel, in some embodiments the machine according to the invention can preferably also comprise, for each pocket of the carousel, a station for insertion of the containers into movement bowls or pucks. Each station for insertion into the pucks can be placed directly below the respective pocket and vertical unscrambling means of the containers. When, however, an orientation station is also provided, each station for insertion into pucks is arranged below the exit of the corresponding orientation station, in such a manner that the station for insertion into pucks receives the container through gravity directly from the exit of the station immediately above it, if necessary already correctly angularly oriented and vertically unscrambled.

Advantageously, each insertion station can comprise: a unit for centering the container with respect to the direction of insertion into the puck. Said unit is substantially aligned with an area for positioning the puck below. Moreover, this centering unit is arranged below the handling station from which the container is fed directly through gravity. In some embodiments, each station for insertion of the containers into pucks or bowls also comprises a pusher unit designed to push the container fed from said centering unit into the respective puck arranged in said positioning area.

According to a preferred embodiment, the machine comprises means for movement of the assembly formed by the centering unit and by the pusher unit from a position moved towards the respective exit from the upper handling station to a position close to the positioning area of the puck.

More in particular, the unit for centering the container can comprise, downstream of the respective exit of the container from said unit, a centering pad for a puck below.

Advantageously, the centering unit can be provided with opposite lateral references, at least one of which can translate transversely with respect to the centering axis, defining a duct open downwards. The pusher unit can comprise a lower support element for the container designed to close said duct, and an upper pusher element designed to act on the upper part of said container by pushing. It is noted that the lower support element and the upper pusher element are associated with a movement system whereby a downward pushing movement of the pusher element is associated with a movement to withdraw the lower support element so as to free said duct inferiorly.

Advantageously, in some embodiments the machine comprises a station to feed pucks towards the puck positioning area, said feeding station in turn comprising:

linear puck movement means designed to be arranged in a row in a loading area, so that at least the first two pucks of the row are in mutual contact;

a stop element, associated with controlled operating means, arranged in proximity of the exit from said loading area for the pucks and designed to prevent advance of the first puck of the row;

a body rotating coaxially and in a synchronized manner with said carousel, having on the periphery thereof a plurality of abutments, equidistant from one another, designed to push and/or to couple the pucks coming from said loading area when they are released by said stop element according to a trajectory designed to move them into said positioning area for insertion of the container.

In general, according to another aspect, the invention also relates to a machine for handling and unscrambling empty containers provided with a bottom and an opening, comprising:

a carousel rotating about an axis of rotation, provided with a plurality of peripheral pockets each provided with a respective channel for descent of the containers through gravity towards a handling or pick-up area below, a device for feeding containers, randomly oriented, towards said carousel, an exit conveyor arranged at a lower height with respect to said pockets and onto which the unscrambled containers are unloaded;

a generic unscrambling system to vertically orient said containers with the opening oriented upwards, not necessarily produced with means for detecting orientation and oscillating or rotating supports, below each pocket, an orientation station, i.e. for angular orientation of the container with respect to its longitudinal axis, or a station for insertion into a puck, or in sequence both an orientation station and a station for insertion into a puck.

In a machine of this type the station for insertion of the containers into the pucks comprises a system for centering or reciprocal positioning between container and puck and preferably a pusher system which allows the single container to be inserted into a respective puck without clearance, i.e. for example with slight interference in a seat provided in the puck. This facilitates subsequent handling operations of the puck+container assembly. A machine of the aforesaid type can advantageously be provided with a synchronized puck feeding system, which inserts a puck in phase with the passage of a pocket above into which a container has been correctly inserted. This makes subsequent systems for recirculation of empty pucks (or godet) unnecessary.

With a machine of this type it is therefore possible, in the same overall dimensions as a normal unscrambling machine, to perform at least two or three of the following operations on the containers: unscrambling the bottles with their openings facing upwards, orienting the bottles angularly with respect to or about their longitudinal axis, i.e. the axis extending from the bottom to the opening, inserting the containers into pucks, preferably with a specific angular orientation and with a sufficient degree of interference to maintain the relative position between container and puck in the subsequent movement steps.

According to a different aspect, the invention relates to a process for handling empty containers with a bottom and an opening, comprising the steps of:

feeding single containers into pockets of a rotating carousel;

detecting the opening-bottom orientation of said containers fed into said pockets;

unscrambling each container with the respective opening oriented upwards, during passage of the container from the respective pocket to a descent channel below, causing the descent of each container from the respective pocket unscrambled with its opening oriented upwards, the descent movement being controlled on the basis of the detected orientation of said containers;

transferring the unscrambled containers onto an exit conveyor.

According to a preferred embodiment of the process according to the invention, an unscrambling member is provided associated with each pocket and each unscrambling member is controlled by an actuator for operation on the basis of the detected opening-bottom orientation of the container inserted in the respective pocket, in such a manner that at the exit of said unscrambling member the container is arranged unscrambled with the opening thereof facing upwards. Preferably, opening-bottom orientation of the container is detected while it is being fed towards the respective pocket.

According to a different aspect, the invention also provides a process for handling empty containers with a bottom and an opening, comprising the steps of:

feeding single containers into pockets of a rotating carousel;

unscrambling each container with the respective opening oriented upwards, during passage of the container from the respective pocket to a descent channel below;

transferring the unscrambled containers onto an exit conveyor.

wherein between the pocket and the exit conveyor the container is also subjected to an orientation step, i.e. of angular orientation with respect to or about its longitudinal axis, or is inserted into a puck, or is centered and mechanically inserted into a puck.

According to yet another different aspect, the invention relates to a process for handling empty containers with a bottom and an opening, comprising the steps of:

feeding single containers in pockets of a rotating carousel synchronously with the movement of said pockets, preferably according to a direction substantially tangential to the rotation movement of the pockets of the carousel and preferably with a speed of the containers substantially equal to the speed of the pockets at the moment in which a container enters the respective pocket;

unscrambling each container with the respective opening oriented upwards, causing descent of each container from the respective pocket unscrambled with its opening oriented upwards;

transferring the unscrambled containers onto an exit conveyor.

Further advantageous characteristics and embodiments of the machine and of the process according to the invention will be described below and are indicated in the appended claims, which form an integral part of the present description.

BRIEF DESCRIPTION OF THE DRAWINGS

Further features and advantages of the invention will be more evident from the description of two preferred but non exclusive embodiments, illustrated by way of non-limiting example in the accompanying drawings, wherein:

FIG. 7 shows an axonometric view of a station for insertion into pucks, in a possible embodiment;

FIG. 8 shows a plan view of the station of FIG. 7;

DETAILED DESCRIPTION OF AN EMBODIMENT OF THE INVENTION

Figure 1:
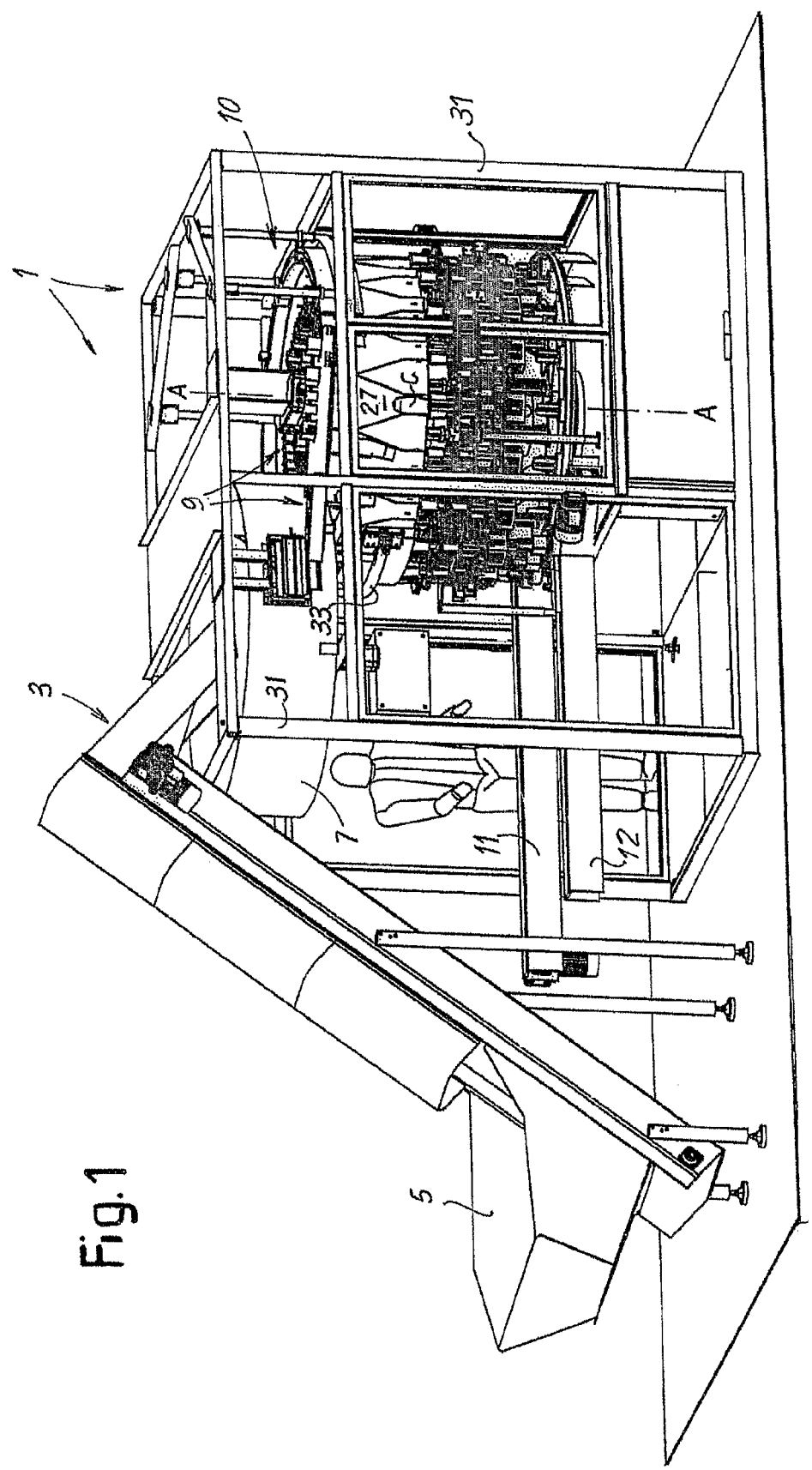
FIG. 1 shows an axonometric view of an unscrambling machine with a system for feeding the containers.
Figure 2:
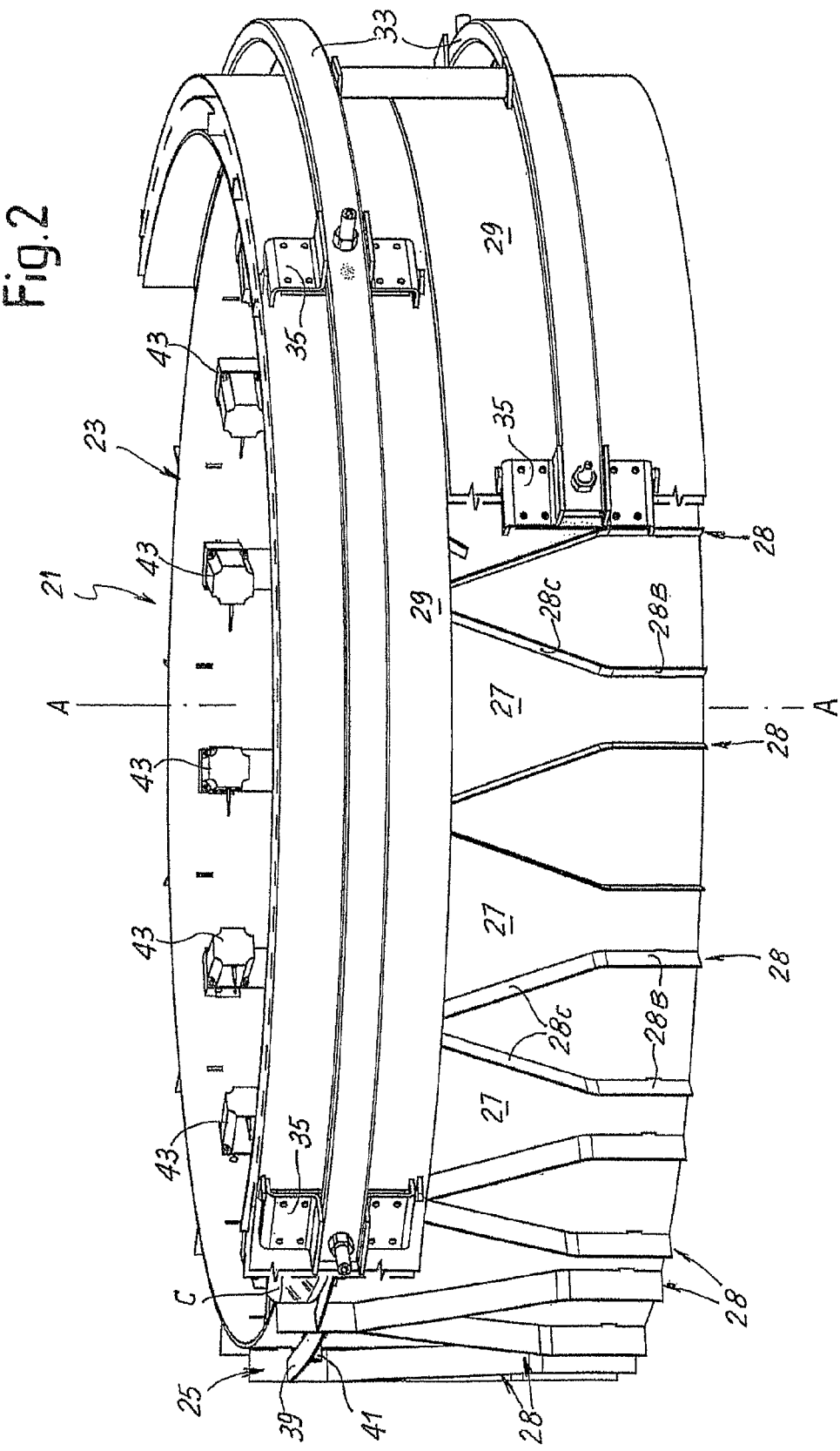
FIG. 2 shows an axonometric view of the carousel with parts removed, in particular showing the arrangement of the external bands that define the interspace in which the pockets of the carousel are produced and moved.

With initial reference to FIG. 1, in the example illustrated the unscrambling machine 10 is fed by means of a conveyor 3 that lifts the bottles, containers or other products to be unscrambled, picking them up from a hopper 5 below to feed them towards a rotating distributor 7. From this latter the single containers are picked up from a feeding device, indicated as a whole with 9 and comprising an input unit, described in greater detail below, to be fed in a controlled manner to the unscrambling machine 10, from which the containers exit, by means of an exit conveyor 11, appropriately unscrambled, i.e. arranged with their openings oriented upwards, and if necessary also angularly oriented about their longitudinal axis and, if required, inserted into pucks bowls or godets, fed by means of a conveyor 12. It must be understood that the system for feeding the containers C to the unscrambling machine 10 can be any, also differing from the one illustrated.

The unscrambling machine 10 comprises a carousel 21 rotating about an axis A-A, vertical in the example illustrated. In other embodiments, not illustrated, the axis A-A can be inclined with respect to the vertical.

The carousel 21 has a cylindrical or annular inner wall 23 on which pockets are defined, distributed peripherally around the circumferential extension of the carousel 21 and indicated schematically with 25. Associated with each pocket 25 is a descent channel 27, along which the containers C descend to the height of the exit conveyor 11.

Extending concentrically to the cylindrical or annular wall 23 is a semi-cylindrical or semi-annular outer wall 29, that closes the pockets 25 and the descent channels 27 on the outside. As the pockets 25 and the channels 27 operate only for an arc of the total circumferential extension of the carousel 21, for example for an arc of 180°, the outer wall 29 can have partial annular or cylindrical extension, for example of only 180°. In this manner, a semi-annular or semi-cylindrical interspace is defined only in the area in which handling of the containers in the pockets 24 and in the members therebelow takes place.

In the embodiment illustrated, the semi-annular or semi-cylindrical outer wall 29 is supported on the fixed structure, indicated with 31 in FIG. 1, for example through half-rings 33. The wall 29 can be formed by one or more bands, in the example illustrated two bands overlapped along the axis A-A of rotation of the carousel 21. Each band forming the radially outer wall 29 is advantageously formed by a sheet of elastic material, such as steel, to be able to deform modifying its layout in order to vary within certain limits the radial dimension of each pocket 25. For this purpose, the band or each annular band forming the radially outer wall 29 is fastened in three or more points distributed angularly along the curved extension of the wall 29 through constraining members 35 which allow a variation of the radial and preferably also tangential position of the constraining point of the band 29 with respect to the fixed structure and in particular to the half-rings 33. By adjusting the constraints 35 it is thus possible to modify the radial distance of the semi-annular or semi-cylindrical outer wall 29 with respect to the inner annular or cylindrical wall 23 modifying the dimension of the semi-annular interspace defined internally by the wall 23 and externally by the wall 29.

Associated with each pocket 25 and with the relative descent channel 27 is a respective unscrambling station of the containers, indicated as a whole with 37. This station is in practice housed in the area in which the respective pocket 25 with the respective descent channel 27 is defined.

In some embodiments, the unscrambling station 37 comprises an oscillating support 39 for each pocket 25. The oscillating support 39 is supported on an axis 41 substantially oriented in radial direction with respect to the axis of rotation A-A of the carousel 21. Oscillation of the support 32 about the axis 41 is controlled by a respective actuator 43 supported on the annular or cylindrical inner wall 23 of the carousel 21. In the embodiment illustrated, one actuator 43 is provided for each pocket 25 and therefore for each oscillating support 39. It would also be possible to produce a machine provided with a smaller number of actuators 43, or even a single actuator 43, arranged in a predetermined position along the circular trajectory taken by the pockets 25 when they rotate integral with the carousel 21, providing a system of temporary engagement between the actuator 43 and the oscillating support 39 that is positioned each time at the point in which the actuator 43 is located. However, the solution illustrated with a number of actuators 43 equal to the number of oscillating support 39 and pockets 25 is simpler from the point of view of construction and control and its cost is relatively limited considering that the actuators 43 can be produced by low cost electronically controlled electric motors.

Each oscillating support 39 forms the bottom of the respective pocket 25 and the container C to be oriented rests thereon. As will be explained in greater detail below, each oscillating support 39 is oscillated in one direction or the other, after a container C has been placed thereon, on the basis of the position, i.e. of the opening-bottom orientation, of the container C in the corresponding pocket 25. Due to this the container will be unloaded into the descent channel 27 below always with the correct opening-bottom orientation, i.e. with its opening A oriented upwards.

In the embodiment illustrated, each descent channel 27 is delimited by two walls 28 integral with the annular or cylindrical inner wall 23 and rotating therewith. Each wall 28 extends in height in radial direction towards the semi-cylindrical or semi-annular outer wall 29, to delimit both the pocket 25 and the descent channel 27. In the example of embodiment illustrated, each wall 28 has a higher vertically extending rectilinear portion 28A, a lower vertically extending rectilinear portion 28B, and an inclined intermediate rectilinear portion 28C that joins the portion 28A to the portion 28B. The portions 28A of each pair of walls 28 of each descent channel 27 are located at a greater tangential distance with respect to the portions 28B, so as to define a descent channel 27 that narrows from the upper position corresponding with the pocket 25 to the lower position from which the containers exit. The rotation axis 41 of the oscillating support 39 is located approximately at the height of the vertical portions 28A of the opposite walls 28 delimiting the respective descent channel 27.

Figure 3:
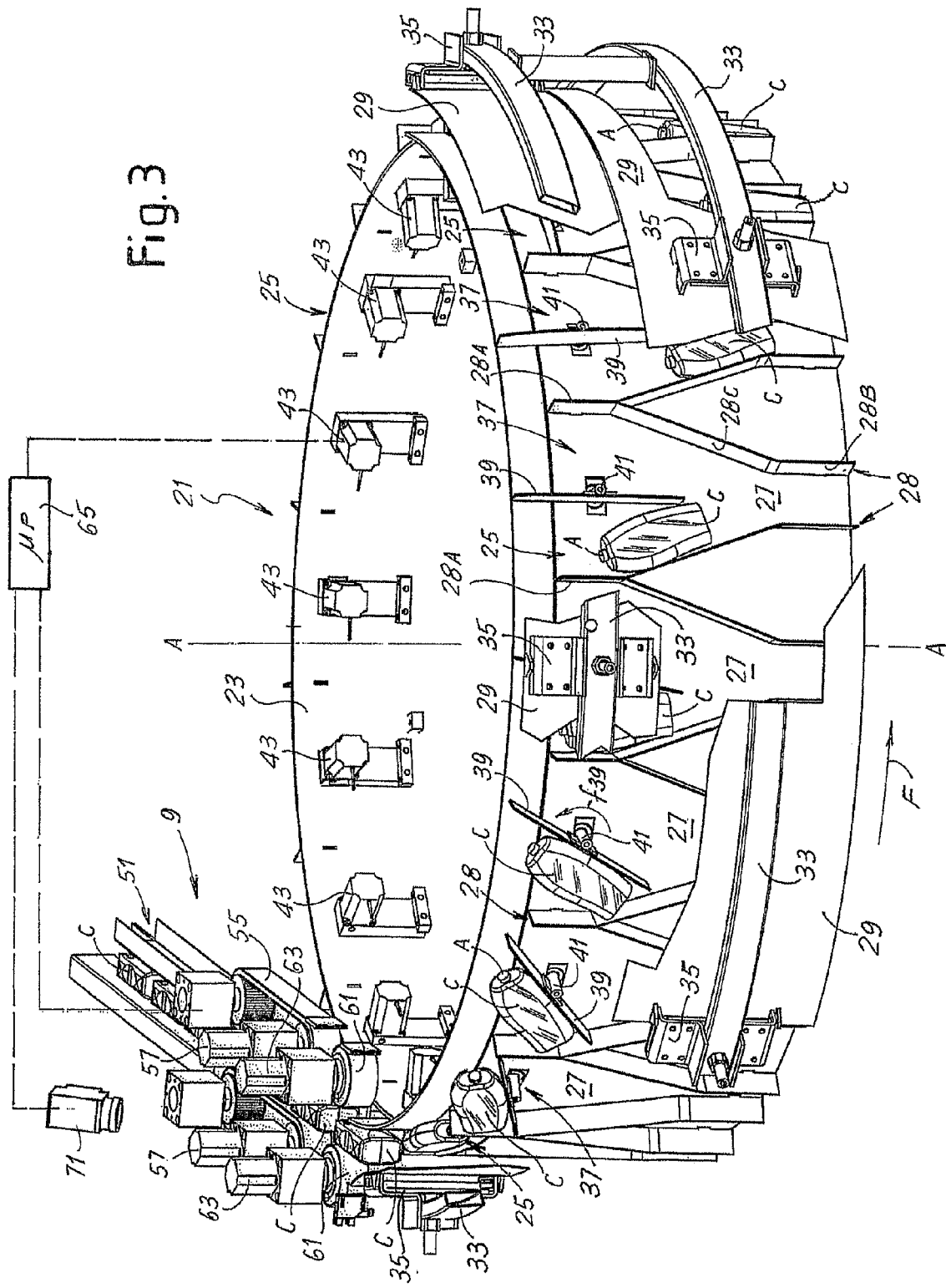
FIG. 3 shows an axonometric view of the carousel with parts removed, which illustrates in detail an unscrambling sequence of the containers.

FIG. 3 shows the sequence of the oscillation movement in one of the two possible directions of rotation of the oscillating supports 39. From this sequence it is easily understood how the containers C, which are placed on oscillating supports 39, are unloaded into the descent channel 27 below. In substance, each oscillating support 39 forms the bottom wall of the respective pocket 25 and receives, resting against it, the respective container C fed from the feeding device 9 (described below) to then unload it towards the descent channel 27 through an oscillation about the axis 41 controlled by the electric actuator 43. It is easily understood from FIG. 3 that when the container C is in the respective pocket 25 oriented with its opening A in the direction of rotation F of the carousel 21, it is unscrambled correctly in vertical direction with its opening A facing upwards by oscillating the respective oscillating support 39 according to the arrow f39 counter-clockwise (in the figure). When, on the other hand, the container C is positioned in the pocket 25 with the opposite opening-bottom orientation, i.e. with the opening A facing the opposite part with respect to the direction of advance F of the carousel 21, it will be unloaded with the correct vertical orientation into the descent channel 27 below simply by making the support 39 oscillate in the opposite direction (i.e. counter-clockwise in the figure) with respect to the direction illustrated in FIG. 3. In this manner, correct opening-bottom orientation, i.e. unscrambling of all the containers C is achieved without the need to shape the pockets 25 on the basis of the format of these containers.

Figure 4:
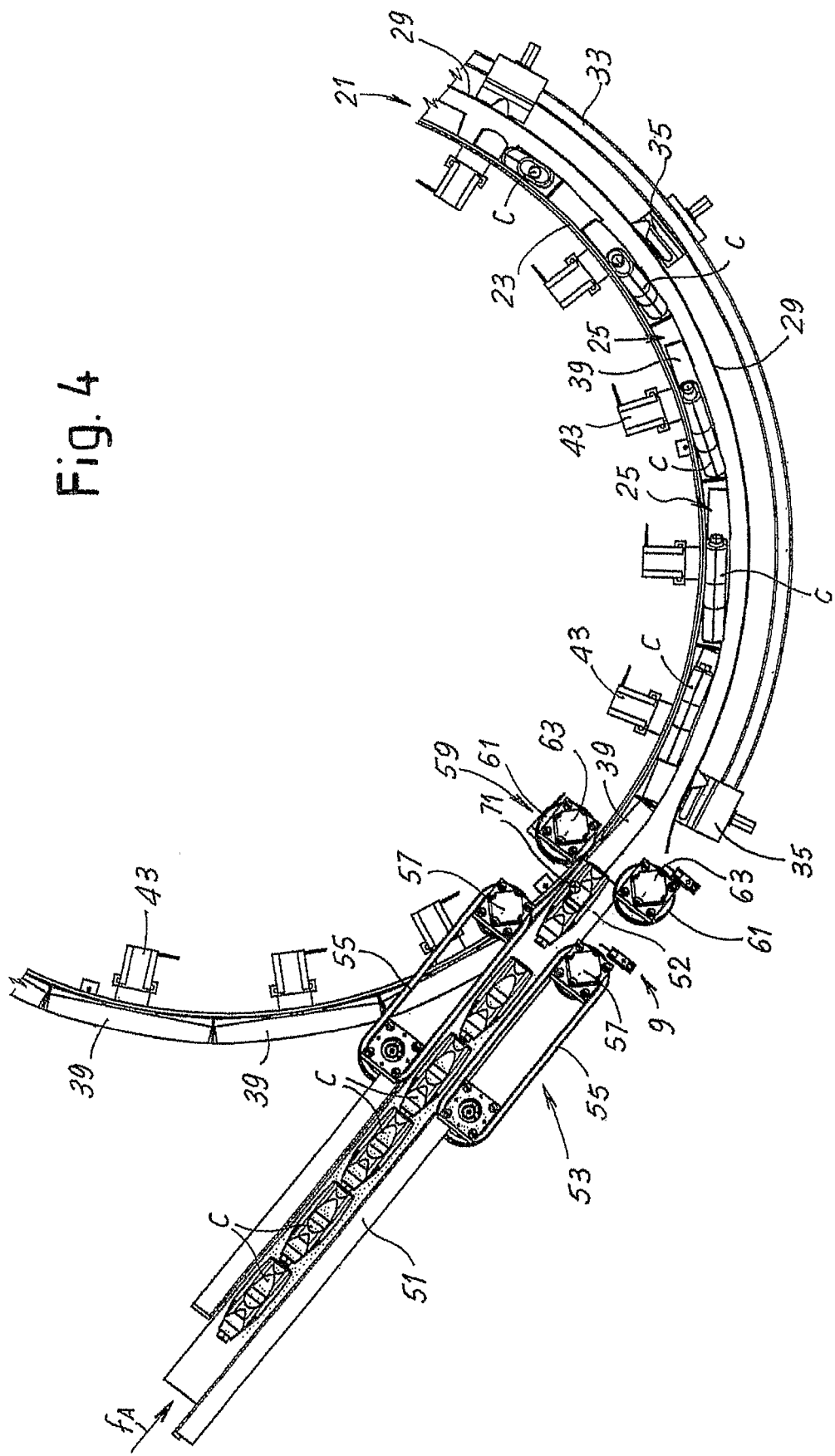
FIG. 4 shows a plan view of the feeding device or input unit of the containers into the pockets of the carousel.

The device for feeding the containers C to the carousel 21 is illustrated in particular in the plan view of FIG. 4. In the embodiment illustrated the feeding device 9 comprises an input unit that has a feed channel 51 inside which the containers C are fed from the rotating distributor 7. There is associated with the feeding channel 51 a first synchronization assembly 53 that synchronizes advance of the containers C with respect to the rotation movement of the carousel 21. In this embodiment the synchronization assembly comprises two opposite endless flexible members 55, forming rotating elements to engage and advance the bottles C along the feeding channel 51. These rotating elements 55 are controlled by electronically controlled electric motors 57. Along the feeding channel 51, whose bottom can be defined by an endless conveyor 52, and downstream (with respect to the direction of advance fA) of the containers C along the feeding channel 51, a second assembly 59 of rotating elements 61 is arranged, with rotation controlled by electronically controlled electric motors 63. In the example illustrated, the rotating elements 61 are composed, for example, of rubber wheels, but it must be understood that they could also be composed of members of another type.

Both the rotating elements 61 and the rotating elements 55 engage the containers C by friction and make them advance in a controlled manner, as described below. When the format of the containers C is varied, the rotating elements 55 and 61 can be adjusted to adapt to the transverse dimensions of the containers.

The motors 57 and the motors 63 are interfaced with an electronic control unit 65 (schematically illustrated in FIG. 3) which is also connected to the motor of the carousel 21 (not shown) and to an angular position encoder that provides the position of the carousel 21, and to the electronically controlled electric motors 43 that control oscillation of the oscillating supports 39. The unit 65 can also be connected to other components of the machine 10, as will be explained below.

The control unit 65 controls movement of the motors 57, 63 in such a manner as to synchronize advance of the single containers C towards the pockets 25 of the carousel 21 so as to insert a single container C in each pocket 25 when this travels in front of the exit area of the input unit of the feeding device 9, i.e. in front of the pair of rotating members 61 of the second synchronization assembly 59. The direction of advance fA of the containers C along the feeding device 9 is substantially tangent to the circular trajectory of the pockets 25 in the area in which the containers C are unloaded from the feeding channel 51 into the respective pockets 25. In this manner particularly delicate handling of the containers C is achieved, without knocks and mechanical stresses. In fact, the programmable electronic control unit 65 allows the speed of advance of the single containers C to be modified so that these enter the pockets 25, substantially without relative speed between container and pocket. There is associated with the feeding device 9 a detecting system 71 to detect the opening-bottom orientation of the single containers C that are fed by the feeding device 9 into the single pockets 25. In some embodiments the detecting system 71 can comprise a video camera associated with image processing software which is managed by the electronic control unit 65. The image processing system allows detection of the shape of each container that passes in front of the detecting system 71 and of which direction the container C is oriented while it advances along the feeding device 9.

In substance, the detecting system 71 with relative image processing software is capable of verifying whether each container C is oriented with its opening A in the direction of advance fA or in the opposite direction. This information, together with the information supplied by the various encoders of the machine to the control unit 65, allows this latter to know with which orientation each container C is inserted into the respective pocket 25. On the basis of this information the control unit 65 will control subsequent rotation of the oscillating support in the correct direction, so that the container C drops correctly oriented with its opening facing upwards along the descent channel 27 as described above.

What has been described and illustrated above represents the minimum configuration that the machine can have in this embodiment. By arranging the exit conveyor 11 at a suitable height below the descent channel 27 it is possible to extract the containers C from the unscrambling machine 10 correctly unscrambled with their openings A facing upwards, without performing any other operations thereon.

However, the structure of the machine described above can be further integrated with other units, stations or devices that allow further operations besides simple unscrambling to be performed on the containers C. In what follows there will be described a complete configuration of the machine, in which, in addition to unscrambling of the containers, angular orientation is also performed, i.e. orientation of each container with respect to its longitudinal axis, i.e. about the axis that extends between the bottom and the opening of the containers. Moreover, the performance of an operation on the unscrambled and angularly oriented containers, to insert each single container C into a puck, is also provided. All these operations are performed in sequence during advance of the single container from the pocket 25 of the carousel 21 towards the exit conveyor below 11, so that the containers exit from this latter unscrambled, oriented and inserted into pucks.

Figure 5:
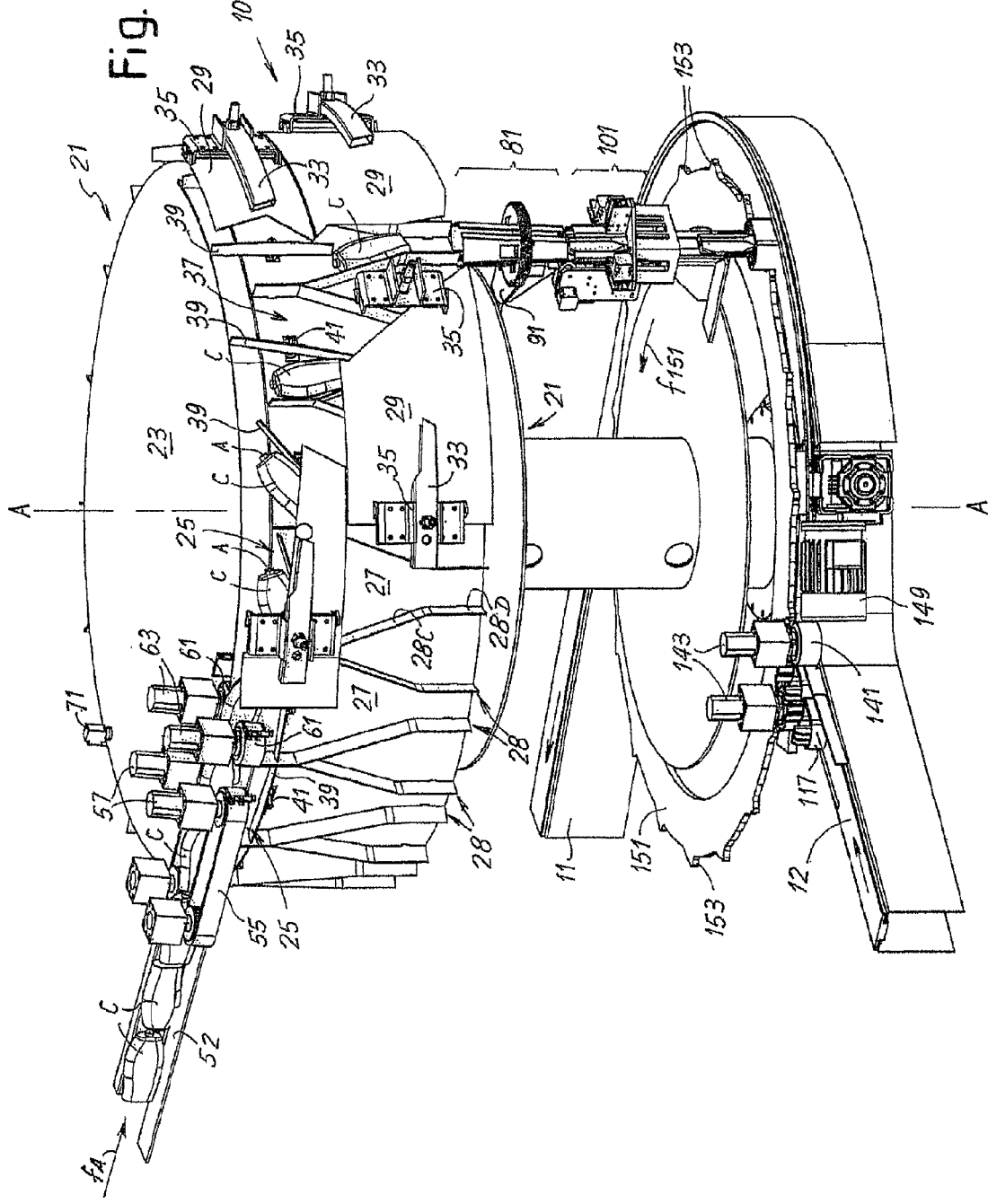
FIG. 5 shows an axonometric view of the carousel with parts removed, which shows a descent channel from the pocket towards the height at which the exit conveyor is located, wherein along the descent path the unscrambling station, the orientation station and the puck insertion station are arranged.

FIG. 5 shows the entire path of a container C through a respective descent channel 27 of a pocket 25, a orientation or angular orientation station below, and a station for insertion into pucks, which advance along the exit container 11 located at the exit height of the containers from the machine 10. The orientation station and the station for insertion into pucks will be described in greater detail below.

In FIG. 5 these two stations are shown limited to one of the pockets 25 of the carousel 21, but it must be understood that, in addition to the unscrambling station comprising the oscillating support 39, each pocket 25 is also provided with its respective station for orientation or angular orientation of the containers about the respective longitudinal axis and with a station below for insertion of the containers into pucks. In some embodiments, for example when containers with rotation symmetry are handled, the orientation or angular orientation station can be omitted. Analogously, when the containers require to be angularly oriented but it is not necessary to place them in pucks, the final station for insertion into pucks can be omitted.

Figure 6:
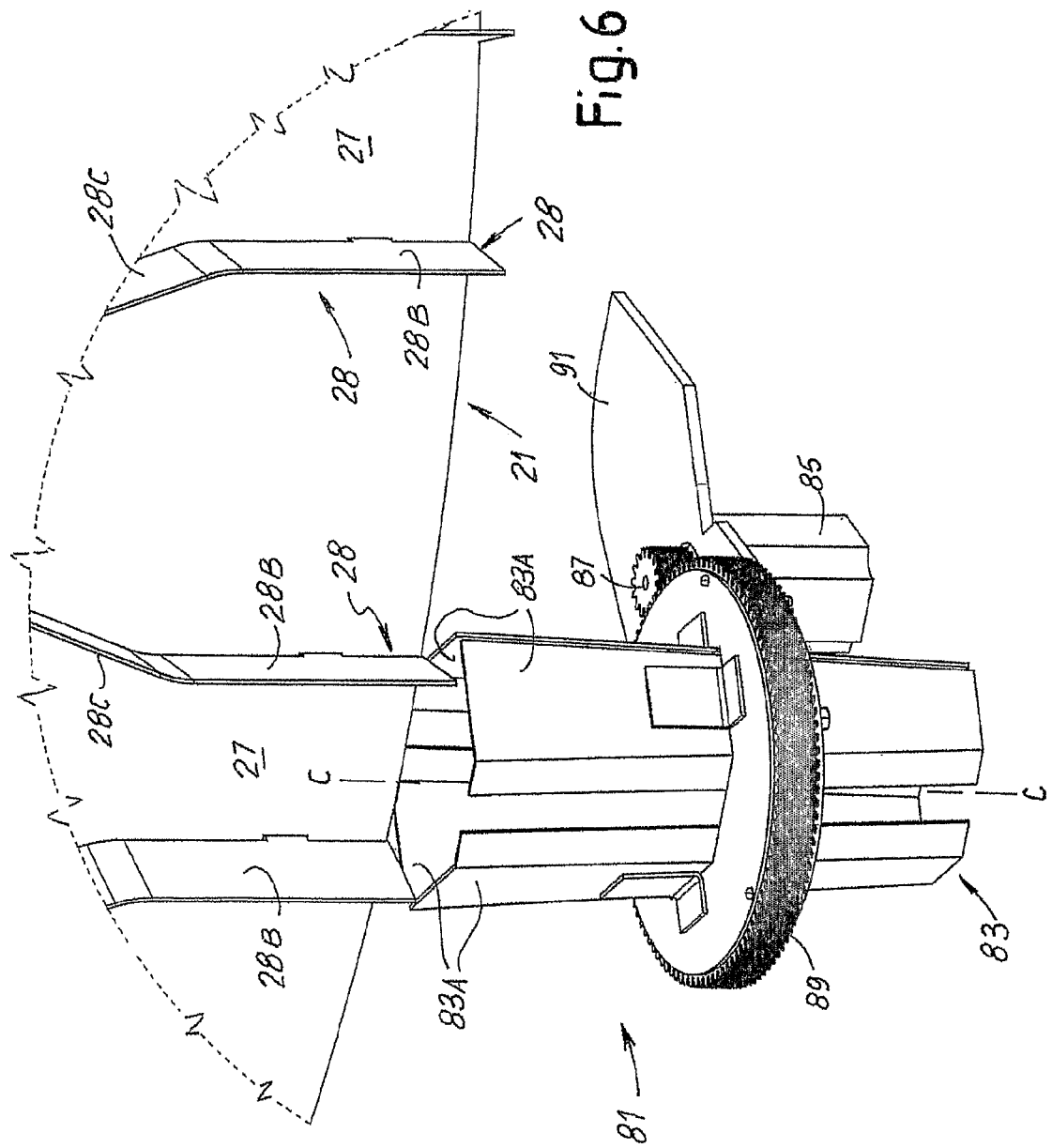
FIG. 6 shows an axonometric view of an orientation station in a possible embodiment.

The orientation or angular orientation station of the containers C is supported by the rotating carousel 21 and rotates therewith, below the respective pocket 25. The orientation or angular orientation station is indicated as a whole with 81 and its structure will be described below with particular reference to FIG. 6. In the embodiment illustrated each angular orientation station 81 comprises a through seat 83 extending substantially vertically, in which the unscrambled containers coming from the descent channel 27 above enter from the top and exit from the bottom. The through seat 83 defines a duct for descent of the containers and is provided with a motor which allows rotation about a substantially vertical axis C-C. Rotation about the axis C-C is achieved, for example, through a respective electronically controlled electric motor 85, fitted on the axis of which is a pinion 87 which meshes with a cogwheel 89 torsionally integral with the through seat 83. All this can be supported by a bracket 91 constrained to the carousel 21.

At a height corresponding to the bottom end of the through seat 83 there can be provided a support, for example formed of an annular plane integral with the fixed structure of the machine, which is interrupted in a predetermined annular position along the circumferential trajectory through with the carousel 21 travels, so that the containers C that are inserted into the through seats 83 are retained inside these for a given curved path along which the containers are driven as a result of rotation of the carousel 21 until reaching the position in which the containers, after losing contact with the annular support plane, drop into the station for insertion of the container into the puck below, described later.

In some embodiments, the through seat 83 of each angular orientation or orientation station of the containers C has a cross section shaped appropriately to allow insertion of containers C also of variable format and such that rotation of the through seat 83 also rotates the container C inserted therein about the axis C-C. In the example illustrated, the through seat 83 is formed by shaped profiles 83A. If necessary, these can be interchangeable to adapt the machine to ranges of formats differing even greatly from one another, although considerable flexibility of the machine can be achieved even without replacing the profiles 83A, due to the fact that these can receive the containers C with a certain degree of clearance, while still being capable of rotating these containers about the axis C-C by a sufficient angle to orient them in the required manner. The angle of rotation performed by each through seat 83 is determined on the basis of the final angular position required by the container and of the dimension and shape of this container. It is therefore possible to appropriately program the control unit 65 on the basis of the final angular position to be obtained and of the format of the container handled each time by the unscrambling machine 10.

Downstream of the orientation or angular orientation station 81 there is positioned, for each pocket 25, a station for 101 for insertion of the containers into pucks. Each station 101 for insertion of the containers C into pucks is moved by the carousel 21 and rotates therewith, integral with the corresponding pocket 25 above.

Figure 9:
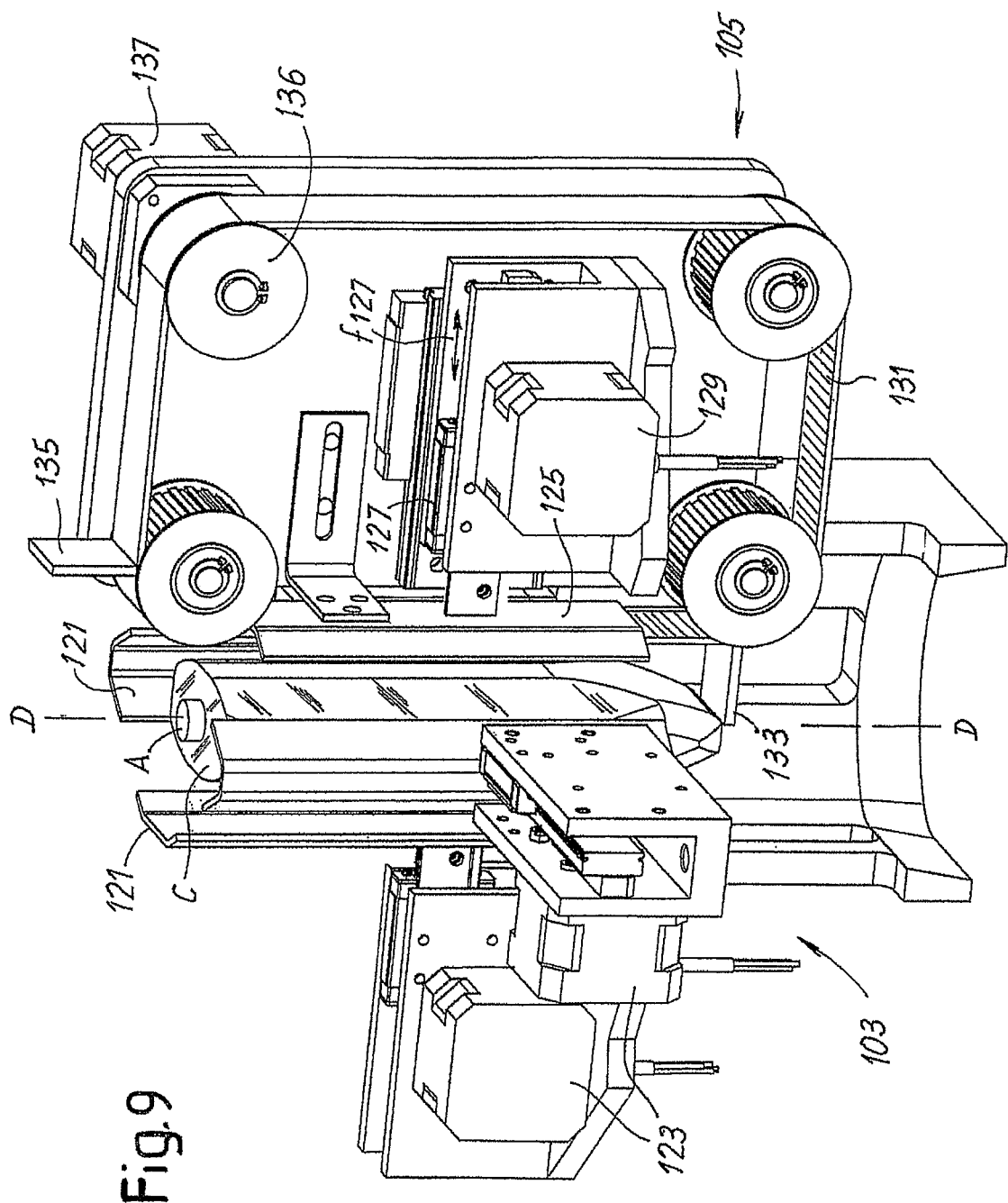
FIG. 9 shows a side view of a detail of the station of FIGS. 7 and 8.
Figure 10:
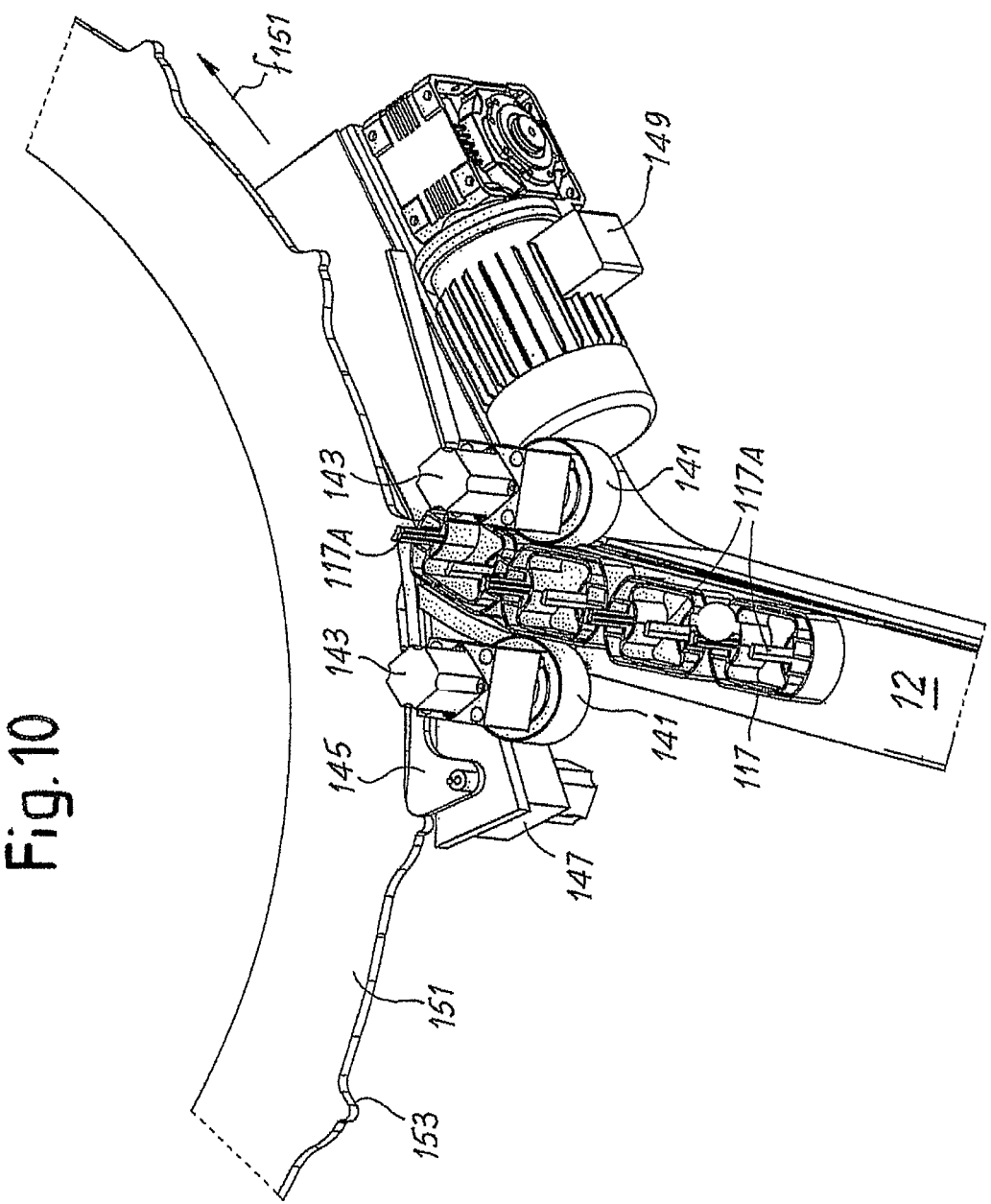
FIG. 10 shows a plan view of the puck feeding system.

The stations 101 have a configuration described in greater detail below with reference to FIGS. 7, 8 and 9, while FIG. 10 shows in greater detail in a plan view the mechanisms used to feed the pucks below the stations 101.

In the embodiment illustrated the station 101 for insertion of the containers C into the pucks comprises a centering unit 103, for centering each container C with respect to the puck below, and a pusher unit 105 that retains each container to perform centering thereof and subsequently pushes it into the puck below. The centering unit 103 and the pusher unit 105 are advantageously supported on a substantially vertical guide 107 which is part of a movement device and which allows movement according to the arrow f101 (FIG. 7) of the centering unit and of the pusher unit 105 to transfer it from an upper position for receiving the containers, adjacent to the orientation or angular orientation station 81 above, towards a lower position below for insertion into the puck. Along the guide 107 there can translate a slide 109, which carries, through a plate 111, the centering unit 103 and the pusher unit 105. The movement according to the arrow f101 of the units 103 and 105 is achieved through an actuator 113, for example an electronically controlled electric motor appropriately interfaced with the programmable electronic control unit 65.

In some advantageous embodiments, below the plate 111 there is positioned a centering pad 115, with the function of centering a puck 117 below with respect to the container C which is centered in the centering unit 103 in the manner described below. Movement according to the arrow f101 of the centering unit 103 causes the pad 115 to move towards the puck 117 below and consequently mutual centering between this latter and the container C which is temporarily located in the centering unit 103.

In some embodiments the centering unit 103 comprises a plurality of opposite lateral references, at least one of which can move transversely with respect to the centering axis D-D. In the embodiment illustrated the centering unit 103 comprises three lateral references 121, each of which can move transversely with respect to the centering axis D-D of the container C inside the centering unit 103. In this embodiment, each lateral reference is formed by an appropriately shaped profile, which can be (but it not necessarily) interchangeable to adapt the machine to various ranges of possible container formats.

In the embodiment illustrated each of the lateral references 121 is movable to move towards and away from the axis D-D in the aforesaid transverse adjustment direction. This movement is achieved through respective actuators, for example electronically controlled electric motors 123, interfaced with and controlled by the programmable electronic control unit 65. The motors 123 control the movement of the respective slides that carry the lateral references 121. It is easily understood, for example from FIG. 8, that by moving the lateral references 121 towards each other and towards the axis D-D, the single container C can be centered with respect to this axis D-D.

In the embodiment illustrated, the pusher unit 105 comprises (see also the detail of FIG. 9) a further lateral reference 125 similar to the lateral references 121, carried by a slide 127 movable according to the arrow f127 when controlled by an actuator 129, for example an electronically controlled electric motor interfaced with the programmable control unit 65, to move towards and away from the centering axis D-D. In front of the reference 125 there extends a branch of a flexible member 121 provided with a lower support element 133 and with an upper pusher element 135. These elements have the function respectively of inferiorly retaining the container C in the centering unit and of pushing this container from the centering unit downwards inside the puck below. Movement of the lower support element 133 and of the upper pusher element 135 is achieved through a motorized pulley 136 operated by an actuator 137, for example an electronically controlled electric motor interfaced with the programmable electronic control unit 65. This motor 137 can make the flexible member 131, and consequently the lower support element 133 and the upper pusher element 135, perform a downward and upward movement.

The station for insertion of the containers C into pucks 117 described above operates as follows. The container C coming from the orientation or angular orientation station 81 above drops through gravity between the lateral references 121 of the centering unit 103 and the lateral reference 125 of the pusher unit 105. In this step the lower support element 133 is advantageously located in the position illustrated in FIG. 9 and forms a lower stop that retains the container at the height at which it will subsequently be centered with respect to the axis D-D by the centering unit 103. For this purpose the lateral references 121 are moved centripetally towards the axis D-D, if necessary together with the lateral reference 125. This latter can in actual fact be made to advance also in a previous step to take the lower support element 133 closer to the axis D-D and thus retain the container C descending from the orientation or angular orientation station 81 above.

Once the container C has been correctly centered with respect to the axis D-D through movement of the lateral references 121, 125 towards each other, it can be pushed downwards making the endless flexible member 131 move so that the lower support element 133 is withdrawn while the upper pusher element 135 engages the container C superiorly and pushes it downwards inserting it into the puck 117 with a certain degree of interference. This latter can, for example, be provided with elastic arms 117A that retain the container C in an erect and angularly defined position inside the puck. A configuration of this type allows, for example, transfer of the containers to a labeling machine already correctly oriented and positioned, without the need for subsequent handling or transfer in other pucks. Before performing this operation, the plate 111 that carries the centering unit 103 and the pusher unit 105 is lowered from an upper position, in which the centering unit 103 of the station 101 is located in proximity to and below the orientation or angular orientation station 81, to a lower position in which the pad 115 interacts with a puck 117 which in the meantime has been positioned under the respective insertion station 101. In this manner the puck 117 is correctly oriented and centered with respect to the centering unit 103, to receive the container C pushed by the pusher element 135.

It must be understood that the centering and pushing operations can also be performed by different members to those illustrated. For example, there can be provided members to support and push the container which are separate and controlled by distinct actuators, in place of the elements supported by the flexible member 131.

The pucks or movement bowls 117 are fed along a path that extends below the path of the pockets 25 to be positioned aligned with the insertion stations 101 in a given position along the circular extension of the trajectory along which the pockets 25 and the descent channels 27 move.

FIG. 10 schematically shows in a top view the mechanisms that allow insertion of the pucks 117 fed from the conveyor 12 into the machine 10 in phase with the single pockets 25. For this purpose, in addition to the conveyor 12 there are provided, in an area for entry of the pucks 117, a pair of advancing members 141, operated by the respective actuators 143, for example electronically controlled electric motors interfaced with the programmable electronic control unit 65. In the example of embodiment illustrated, the advancing members 141 comprise rubber wheels with substantially vertical axis arranged at the two sides of the feeding channel of the pucks 117, whose lower surface is defined by the conveyor 12 or by a surface forming the continuation of the conveyor 12. The pucks are pushed against one another, i.e. one in contact with the other in a row along the feeding channel defined by the conveyor 12 and against the stop element 145 that retains the first puck 117 of the row, preventing further advance thereof along the channel defined by the conveyor 12. The stop element 145 blocks the puck 117 until the moment in which said puck must be inserted in the circular advancing trajectory in a manner synchronized with the passage of a respective pocket 25 above.

The stop element 145 is controlled by operating means 147, for example an electronically controlled electric motor interfaced with the programmable electronic control unit 65. The stop element 145 and its actuator 147, and the members 141 and 143 are supported by the fixed structure of the machine 10. In FIG. 10 the motor 149 that operates the conveyor 12 is also visible.

The conveyor 12 is inserted tangentially with respect to the circular path along which a body 151 moves, rotating in a synchronous and coaxial manner with the carousel 21 about the axis A-A. Preferably, synchronism between the carousel 21 and the rotating body 151 is achieved simply by producing these two elements mutually integral, but it would also be possible to operate them using separate motors maintained in phase.

In the embodiment illustrated along the rotating body 151 there are arranged members to engage the pucks 117. In the example illustrated, these engaging members are indicated with 153 and are composed of dog teeth arranged along the radially outermost perimeter edge of the rotating body 151. Rotation of the rotating body 151 according to the arrow f151 is synchronized with the movement of the stop element 145. Synchronism is such that the stop element 145 releases the first puck 117 in the row in a manner synchronized with travel of a pocket 25 above. In this manner the first puck is pushed by the puck behind in turn pushed by the wheels 141, until the first puck 117 engages with the corresponding dog tooth 153 integral with the rotating body 151. Once engaged with the dog tooth 153 the puck 117 is driven along the circular trajectory integral with the members of the carousel 21 above and, more precisely: the pocket 25, the unscrambling station, the orientation or angular orientation station and the station for insertion into the puck. In this manner the respective container C inserted into the pocket 25 can descend along a virtual channel defined by the descent channel 27 and by the stations below until it is inserted into the puck 117 and then conveyed by the conveyor 11 outside the machine 10.

The arrangement described, with the stop element 145 controlled in synchronism with passage of the pockets 25, allows single pucks to be inserted always in phase with pockets 25 in which the containers C have been inserted correctly and makes it possible to prevent the insertion of pucks aligned with pockets in which no corresponding container has been inserted, or in which the container is defective and must be rejected. In this manner, there is no need to provide systems for the recovery and/or recirculation of empty pucks at the exit of the unscrambling machine 10.

Figure 11:
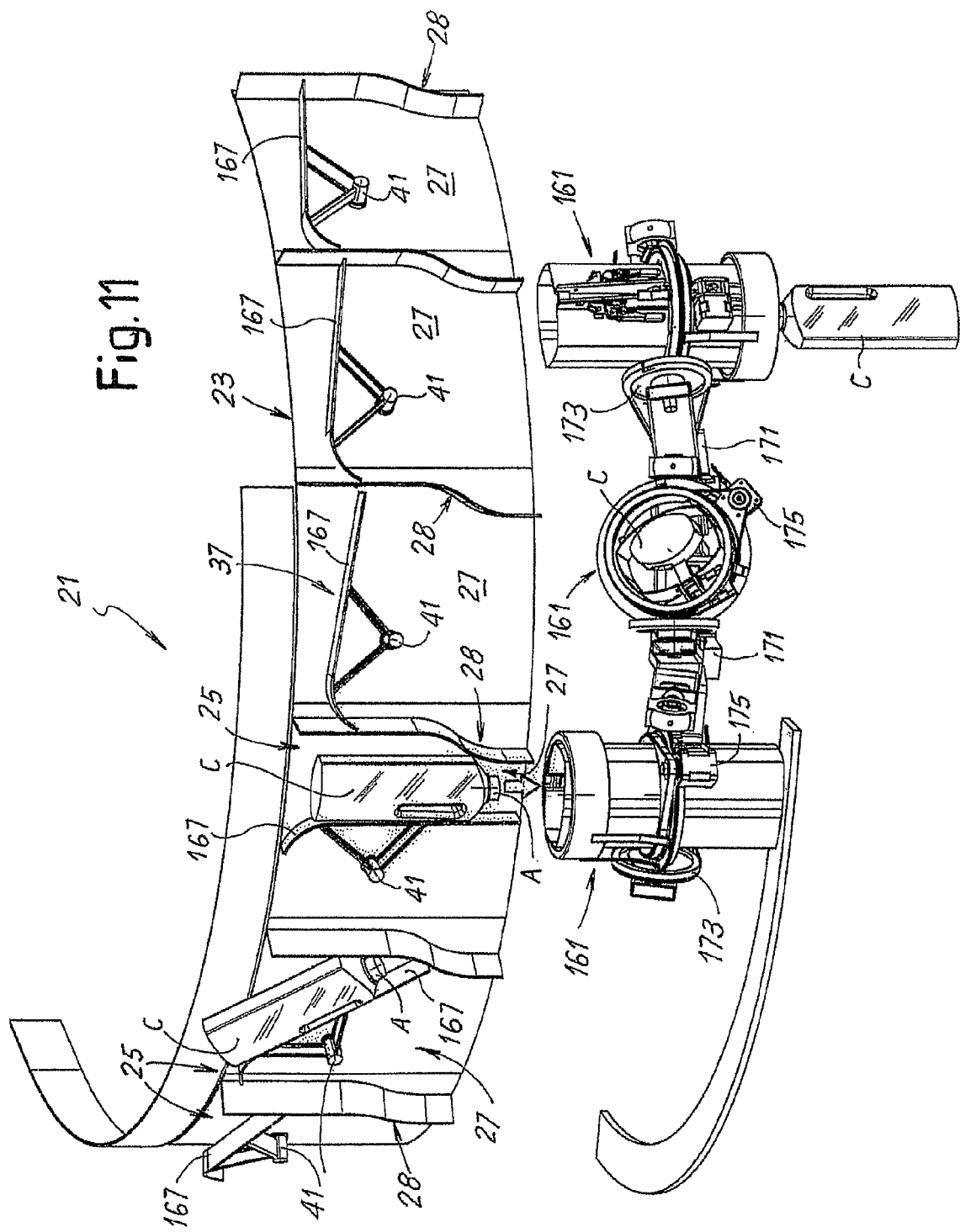
FIG. 11 shows an axonometric view similar to the view of FIG. 3 in a different embodiment of the machine.

FIG. 11 shows a variant of embodiment wherein the vertical unscrambling and, if necessary, orientation operations of the containers, i.e. angular orientation about the respective longitudinal axes, are performed in a single station positioned under each pocket 25. In this embodiment, there is provided a rotating member 161 defining a through seat for the containers, which can be arranged with substantially vertical orientation under the respective pocket 25 and substantially along the descent channel 27. This rotating member can perform a rotation of at least 180° about an axis substantially orthogonal to the direction of descent of the containers. Above the rotating member 161 there is arranged an oscillating support 167 designed to oscillate when controlled by an actuator analogous to the electric motor 43, but which imparts to the oscillating support 167 a rotation always in the same direction. Consequently, the containers drop into the rotating member 161 below with a random vertical orientation, i.e. with the opening A facing upwards or facing downwards. The rotating member 161 performs a rotation of 180° or does not perform rotation depending on how the container C is oriented when it is located in the pocket 25. If it is located in a position such that by overturning the oscillating support 167 towards the rotating member 161 below the container C is arranged with its opening A facing upwards, the rotating member 161 does not perform rotation about the horizontal axis. Otherwise, it performs the rotation of 180° so as to position the container C with the opening A facing upwards, i.e. unscrambling in this manner all the containers C.

In some embodiments, the rotating member 161 can perform, in addition to the aforesaid rotation of 180° to unscramble the containers C vertically, a rotation about its longitudinal axis to perform an orientation or angular orientation of the containers, i.e. rotation and angular positioning about the longitudinal axis of these containers, in the same manner as performed in the station 81 of the previous example of embodiment. FIG. 11 schematically indicates a motor 171 that controls, by means of a belt and a pulley 173, rotation of the rotating member 161 about a substantially horizontal axis, tangent to the direction of movement of the carousel 21, to unscramble the containers C. Vice versa, 175 indicates a motor that controls rotation of the member 161 about an axis coincident with or parallel to the axis of the container C inserted therein, to perform angular orientation thereof.

In substance, in this embodiment the orientation or angular orientation station and the vertical unscrambling station are incorporated into a single station comprising the rotating member 161 and the oscillating support 167, which also forms the bottom of the respective pocket 25. Under the station 161, 167, there can be located a corresponding station for insertion into pucks, for example produced as described previously and illustrated in particular in FIGS. 7, 8, 9 and 10.

With a machine of this type it is possible to perform a handling and unscrambling process of the containers C comprising the steps of: feeding single containers into the pockets 25 of the rotating carousel 21; unscrambling each container with the opening oriented upwards; and transferring the unscrambled containers onto an exit conveyor 11. The process provides for detecting orientation of the containers fed to the pockets to subsequently control the unscrambling operation of the container that is obtained, instead of with a mechanical configuration of the pockets, with an active member, composed of the oscillating element 39 or of the rotating element 167, whose rotating and oscillating movements are controlled by the control unit 65 on the basis of information obtained from the detecting system 71.

It is understood that what is illustrated represents only possible non-limiting embodiments of the invention, which can vary in its forms and arrangements without departing from the scope of the concept underlying the invention. Any reference numbers in the appended claims are provided purely for the purpose of facilitating reading of these claims in the light of the description above and of the accompanying drawings and do not in any way limit the scope of protection.

The invention claimed is:

1. A machine for handling and unscrambling empty containers provided with a bottom and with an opening, the machine comprising:
    a carousel rotating about an axis of rotation, provided with a plurality of peripheral pockets, each of said pockets being provided with a respective channel for descent of the containers through gravity towards a handling or pick-up area below;
    a device for feeding containers, randomly oriented, towards said carousel;
    an exit conveyor arranged at a lower height with respect to said pockets and onto which the containers, unscrambled in an unscrambling step so as to be arranged with the respective openings oriented upwards, are unloaded;
    a detecting system to detect the opening-bottom orientation of said containers before the unscrambling step, wherein a respective unscrambling station for the containers is provided for each of said pockets, controlled based on information supplied by said detecting system and designed to arrange said containers correctly unscrambled with said opening facing upwards, said detecting system being associated with said feeding device to determine opening-bottom orientation of each container while each container advances in said feeding device.

2. A machine according to claim 1, wherein said unscrambling station is arranged under the respective pocket and said unscrambling station comprises means for rotating the containers, controlled based on the information supplied by said detecting system.

3. A machine according to claim 1, further comprising:
    a respective handling area under each pocket to angularly orient, with respect to an axis of the containers, the containers previously unscrambled in the unscrambling station, the unscrambled and angularly oriented containers being released onto said exit conveyor.

4. A machine according to claim 3, further comprising:
    another handling area under each pocket to insert said containers into pucks, the pucks with respective containers inserted therein being released onto said exit conveyor.

5. A machine according to claim 4, wherein said handling area for angularly orienting the containers and said handling area for inserting the containers into the pucks are arranged in sequence below the respective pocket, the unscrambling station, the handling area for angularly orienting the containers and the handling area for insetting the containers into the pucks forming a descent path of the containers extending between a respective pocket and a height at which said exit conveyor is located.

6. A machine according to claim 1, further comprising:
an electronic control designed to produce an association between the opening-bottom orientation of a container detected by said detecting system and a relative pocket into which the container is fed.

7. A machine according to claim 6, wherein said feeding device of the containers is arranged and designed to feed said containers directly into respective pockets with a movement of the containers in phase with the movement of the pockets.

8. A machine according to claim 1, wherein each unscrambling station comprises a support with controlled oscillation provided for receiving the containers resting against the support and to perform controlled oscillation between a position to receive the container and an inclined position to unload the container into a respective descent channel.

9. A machine according to claim 8, wherein said oscillating support is capable of rotating according to two opposite directions with respect to the position for receiving the container, a direction of rotation being set based on information regarding opening-bottom orientation of the container entering said pocket acquired by said detecting system for opening-bottom orientation of the container, so that said containers descend into the respective descent channels always unscrambled with the opening oriented upwards.

10. A machine according to claim 8, wherein said oscillating support is rotatable in a single predetermined direction with respect to the position for receiving the container, and said unscrambling station comprises a container handling device, arranged below the respective pocket, said handling device being overturnable based on information regarding the opening-bottom orientation of the container entering said pocket acquired by said detecting system, so as to position each container always unscrambled with the opening thereof facing upwards.

11. A machine according to claim 10, wherein a revolution means is associated with said handling device for overturning thereof about a direction orthogonal to an axis of the container that can be housed therein, and a rotation about the axis of the container.

12. A machine according to claim 8, wherein each said oscillating support is controlled by an electric actuator thereof, said electric actuator being controlled by a control unit based on the information supplied by said detecting system.

13. A machine according to claim 8, wherein each said oscillating support forms, with a descending lateral wall, a portion of the descent channel into which the container is dropped as a result of rotation of said oscillating support.

14. A machine according to claim 8, wherein:
said carousel comprises an annular interspace on a periphery thereof, said annular interspace being coaxial with the axis of rotation of the carousel, said pockets being defined inside said interspace, each pocket being delimited at least in part by an inner annular wall, by an outer annular wall and by radial walls extending between said inner annular wall and said outer annular wall; and
a distance between the outer annular wall and the inner annular wall is variable to allow a variation of the radial dimension of the pockets.

15. A machine according to claim 14, wherein said outer annular wall is formed at least in part by a band, open at ends thereof and constrained to said carousel through constraining members produced in such a manner as to adjust a radial position of said band with respect to the inner annular wall.

16. A machine according to claim 1, wherein said feeding device comprises an input unit of said containers into said carousel according to a direction substantially tangent to said carousel so that said containers are arranged directly at an entrance of the pockets that face, during rotation of the carousel, an exit of said input unit, movement of said containers by said input unit taking place according to a direction substantially concordant with an axis of said containers.

17. A machine according to claim 16, wherein said input unit is associated with electronic synchronization means for verifying a position of the container, for verifying an angular position of the pocket of said carousel into which the container must be inserted and for modifying a speed of the container in said input unit in such a manner as to allow the container to be inserted into the relative pocket.

18. A machine according to claim 17, wherein said input unit comprises a feeding channel in which the containers are designed to be translated, wherein a synchronization assembly is associated with said feeding channel, said synchronization assembly comprising opposite rotating elements with a direction of rotation concordant with a feeding direction of the containers, designed to move the containers by friction, wherein a rotation speed of the rotating elements of said assembly being managed by said electronic synchronization means.

19. A machine according to claim 18, further comprising:
a second assembly of opposite rotating elements, downstream of said synchronization assembly, with a direction of rotation concordant with the feeding direction of the containers, arranged at sides of said channel and designed to further vary the speed of said containers to allow release of the containers into the respective pockets with speeds similar to those of a respective pocket.

20. A machine according to claim 1, further comprising:
for at least some of said pockets, an angular orientation station of the containers with respect to an axis thereof to position each container in a predetermined angular position with respect to the axis thereof, said angular orientation station being positioned below a corresponding unscrambling station.

21. A machine according to claim 20, wherein each angular orientation station comprises a through seat defining a duct for descent of the containers and provided with a motor designed to rotate said through seat, wherein a cross section of said through seat is shaped to drive the container in rotation together with said through seat about an axis parallel to the axis of the container or coincident therewith.

22. A machine according to claim 21, wherein said through seat has a cross section adjustable based on one or more of a shape of the container and a dimension of the container.

23. A machine according to claim 1, wherein a corresponding station is associated with at least some of said pockets a for insertion of the containers into pucks arranged below a respective pocket.

24. A machine according to claim 23, wherein each station for insertion of the containers into the pucks comprises:
a unit for centering the container with respect to a direction of insertion into the puck, said unit being substantially aligned with an area for positioning the puck below; and
a pusher unit designed to push the container from said centering unit inside a respective puck positioned below the centering unit.

25. A machine according to claim 24, further comprising:
a device for moving an assembly formed by said centering unit and said pusher unit from an upper position to a lower position and from the lower position to the upper position.

26. A machine according to claim 24, wherein said unit for centering the container comprises a centering pad for a puck below, said centering pad being downstream of a respective exit of the container from said unit.

27. A machine according to claim 24, wherein:
said centering unit is provided with opposite lateral references defining a duct open downwards, at least one of said opposite lateral references being translatable a transversely with respect to the centering axis, said pusher unit comprising a lower support element for the container designed to close said duct, and an upper pusher element designed to act on an upper part of said container by pushing; and
said lower support element and said upper pusher element are associated with a movement system whereby a downward pushing movement of the pusher element is associated with a movement to withdraw the lower support element so as to free said duct inferiorly.

28. A machine according to claim 24, comprising:
a station to feed pucks along a path below said pockets, comprising:
  a puck movement means designed to be arranged in a row in a loading area, so that at least a first two pucks of a row are in mutual contact;
  a stop element, associated with controlled operating means and arranged in proximity of an exit from said loading area and designed to prevent advance of a first puck of the row;
  a body rotating coaxially and in a synchronized manner with said carousel, having on a periphery thereof, equidistant from one another, members to engage the pucks coming from said loading area when the pucks are released by said stop element, said engaging members feeding the pucks according to a trajectory designed to insert the pucks into said path.

29. A process for handling empty containers with a bottom and an opening, the process comprising the steps of:
feeding single containers into pockets of a rotating carousel;
detecting opening-bottom orientation of said containers while said containers are fed towards respective pockets;
unscrambling each container with a respective opening oriented upwards, during passage of the container from a respective pocket to a descent channel below, wherein the step of unscrambling provides for causing descent of each container from the respective pocket unscrambled with the opening thereof oriented upwards, the descent movement being controlled based on the detected orientation of said containers;
transferring the unscrambled containers onto a exit conveyor.

30. A process according to claim 29, further comprising:
providing an unscrambling member associated with each pocket and controlling each unscrambling member based on the detected opening-bottom orientation of the container inserted in the respective pocket, so that at an exit of said unscrambling member the container is arranged unscrambled with the opening thereof facing upwards.

31. A process according to claim 30, wherein said unscrambling member comprises a rotating or oscillating element, and a direction of oscillation or rotation of the rotating or oscillating element is controlled based on the opening-bottom orientation of the container in the respective pocket, the direction of rotation or oscillation being selected in such a manner that the container is always oriented with the opening thereof facing upwards.

32. A process according to claim 30, further comprising:
angularly orienting said containers with respect to an axis of the containers in a position below a corresponding unscrambling member and transferring the angularly oriented containers onto said exit conveyor.

33. A process according to claim 29, further comprising:
angularly orienting said containers with respect to an axis the containers in a position below said pockets along the descent channel.

34. A process according to claim 29, further comprising:
inserting the containers into respective pucks in a position below said pockets along a descent path of the containers from said pockets.

35. A process according to claim 34, further comprising:
pushing the container, with a predetermined angular orientation, into a respective puck in a station for insertion into the pucks positioned below said unscrambling member and transferring the containers inserted in respective pucks onto said exit conveyor.

36. A process according to claim 35, further comprising:
angularly positioning and mutually centering said container and said puck before pushing the container into the puck.

* * * * *